(12) United States Patent
Sorenson et al.

(10) Patent No.: US 11,835,339 B1
(45) Date of Patent: Dec. 5, 2023

(54) CONTINUOUS ONLINE SELF-CALIBRATION FOR GYROSCOPES THROUGH MODULATION OF DAMPING AXES

(71) Applicant: HRL Laboratories, LLC, Malibu, CA (US)

(72) Inventors: Logan Sorenson, Thousand Oaks, CA (US); David Chang, Calabasas, CA (US); Hung Nguyen, Malibu, CA (US); Matthew Pelliccione, Santa Monica, CA (US); Raviv Perahia, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 74 days.

(21) Appl. No.: 17/713,789

(22) Filed: Apr. 5, 2022

(51) Int. Cl.
   *G01C 19/5776* (2012.01)

(52) U.S. Cl.
   CPC .................. *G01C 19/5776* (2013.01)

(58) Field of Classification Search
   CPC .................................... G01C 19/5776
   See application file for complete search history.

(56) References Cited

U.S. PATENT DOCUMENTS

| | | | | |
|---|---|---|---|---|
| 4,159,502 A * | 6/1979 | Mayer | ........... | G01C 19/04 367/176 |
| 4,884,446 A * | 12/1989 | Ljung | ........... | G01C 19/5642 73/504.12 |
| 6,032,099 A * | 2/2000 | Fernandez | ........... | G01C 21/188 73/178 R |
| 6,155,115 A * | 12/2000 | Ljung | ........... | G01C 19/5719 73/504.12 |
| 6,253,612 B1 * | 7/2001 | Lemkin | ........... | G01C 19/56 73/504.02 |
| 7,103,477 B1 | 9/2006 | Lee | | |
| 9,417,067 B1 * | 8/2016 | Liu | ........... | G01C 25/005 |
| 9,869,552 B2 * | 1/2018 | Gregory | ........... | G01P 15/13 |
| 10,444,014 B1 | 10/2019 | Sorenson et al. | | |
| 10,571,267 B1 | 2/2020 | Sorenson et al. | | |
| 10,697,772 B1 | 6/2020 | Sorenson et al. | | |
| 2006/0272414 A1 * | 12/2006 | Ayazi | ........... | G01P 15/0802 73/514.32 |

(Continued)

OTHER PUBLICATIONS

U.S. Appl. No. 16/673,878, Sorenson, filed Nov. 4, 2019.
"Coriolis Vibratory Gyros" D.D. Lynch, Symposium Gyro Technology 1998 Stuttgart, Germany.

*Primary Examiner* — David J Bolduc
(74) *Attorney, Agent, or Firm* — Ladas & Parry, LLP

(57) ABSTRACT

A CVG having first and second degenerate resonator modes with each a damping rate; drive circuits for causing the resonator to oscillate in the first and second modes in response to first and second drive signals; first and second sense circuits for generating first and second sense signals in response to the resonator oscillating in the first and second modes; a signal processing circuit having control loops for generating the first and second drive signals based on the first and second sense signals; and first and second damping feedback circuits for generating first and second damping feedback signals proportional to the first and second damping rates; an adding the damping feedback signals to the first and second drive signals.

24 Claims, 13 Drawing Sheets

(56) References Cited

U.S. PATENT DOCUMENTS

| | | | |
|---|---|---|---|
| 2013/0179105 A1* | 7/2013 | Liu | G01C 25/005 |
| | | | 702/87 |
| 2014/0208823 A1* | 7/2014 | Trusov | G01P 15/125 |
| | | | 73/1.38 |
| 2015/0054589 A1* | 2/2015 | Ward | G11C 5/005 |
| | | | 331/18 |
| 2015/0192415 A1* | 7/2015 | Ge | G01C 19/5776 |
| | | | 73/504.13 |
| 2015/0211857 A1* | 7/2015 | Ruf | G01C 19/56 |
| | | | 73/504.12 |
| 2015/0285658 A1* | 10/2015 | Zotov | G01C 19/5776 |
| | | | 73/497 |
| 2016/0003618 A1* | 1/2016 | Boser | G01D 5/243 |
| | | | 73/504.12 |
| 2016/0091339 A1* | 3/2016 | Weinberg | G01C 25/005 |
| | | | 73/1.77 |
| 2016/0109258 A1* | 4/2016 | Boser | G01C 25/00 |
| | | | 73/504.12 |
| 2016/0169935 A1* | 6/2016 | Trusov | G01P 15/125 |
| | | | 73/1.38 |
| 2016/0202060 A1* | 7/2016 | Liu | G01C 19/5776 |
| | | | 73/504.12 |
| 2018/0080954 A1* | 3/2018 | Ono | G01P 15/08 |

* cited by examiner

CONTINUOUS ONLINE SELF-CALIBRATION FOR GYROSCOPES THROUGH MODULATION OF DAMPING AXES

CROSS REFERENCE TO RELATED APPLICATIONS

NA

STATEMENT REGARDING FEDERAL FUNDING

NA

TECHNICAL FIELD

This disclosure relates to Coriolis vibratory gyroscopes and methods of operating thereof.

BACKGROUND

Coriolis Vibratory Gyros (CVGs) preferably use resonators with axisymmetric bodies (vibrating string, cylinder, hemisphere) but they can also use resonators with asymmetric bodies (tuning forks, etc.). In a CVG, one of the resonant modes of an elastic body or resonator is excited to a prescribed amplitude. When the device rotates about a particular body-fixed axis, the resulting Coriolis forces acting on the body's vibrating mass elements excite a different resonant mode. The rate at which energy is transferred to this second mode is a measure of the rotation rate about the sensitive axis. Preferably, the natural frequency or the second mode is at or near that of the first. CVGs are particularly suitable for being manufactures as MEMs and are thus desirable in a number of apparatuses, such as environmentally robust, high-performance inertial sensors with attractive CSWaP (Cost Size Weight and Power), for example in weapon systems or vehicle navigational and/or location systems. However, CVGs generally present a measurement bias or zero offset that must be dealt with. In particular, the value of the bias can drift with time, and the bias drift must be addressed to have reliable CVGs.

The bias drift is a critical figure of merit (FOM) because it relates to the ability of the CVG to determine if the rotation rate being applied to the system or platform it is installed on is constant. If the input rotation is constant, but the gyro bias is drifting, errors can build up in the orientation and navigation systems which are used to guide and navigate the system or platform, causing them to, e.g., go off course or miss their intended target locations. Therefore, it is desired to eliminate gyro bias drift.

US applications No. 10,444,014, 10,571,267 and 10,697,772 disclose a method of bias drift improvement based on locking the resonator of a CVG to an atomic clock or other frequency reference more stable than the CVG itself. An electrical modulation to the CVG resonator can also be applied to induce an instantaneous bias in the CVG control system which can be used to cancel the bias drift by ensuring that the instantaneous bias has equal magnitude and opposite sign to the bias drift at any given instant in time. A continuous reversal of the gyroscope input axis (to separate the gyro bias from the gyro rate measurement) can also be implemented by dynamically interchanging the "drive loop amplitude" and the "sense loop amplitude" of the CVG, in an operation called continuous mode reversal. The electrical modulation applied to the CVG resonator can for example be applied to the tuning electrodes of the CVG, such that a frequency split is introduced between the two gyroscopic vibratory modes of the CVG resonator. Since the frequency split is proportional to a change in the damping time constants, by the physical operating principles of the CVG, this induces an instantaneous bias in the CVG system in relation to applied external rotations.

There exists a need to improve upon this prior art by eliminating the requirement to have an atomic clock or more stable frequency reference. There also exists a need to improve upon this prior art by providing an alternate means to inducing an instantaneous bias in the CVG system by inducing a frequency split to modulate the damping time constants.

U.S. application Ser. No. 16/673,878 discloses a concept of partial input axis reversal (PIAR), rather than full input axis reversal (or full mode reversal). U.S. Pat. No. 7,103,477 discloses a scheme that requires 2 CVGs (or other gyroscopes) to function, and also does not provide continuous and online operation as the scheme requires a brief switching period. There exists a need for a CVG that improves the prior art CVGs, for example by requiring a single CVG resonator or by providing continuous and online operation.

What is needed is a CVG (and related method of operation) that allows measuring bias continuously, that does not require redundant sensors to operate, that does not require an atomic clock or a more stable frequency reference t.

The embodiments of the present disclosure answer these and other needs.

SUMMARY

Embodiments of this presentation comprise a Coriolis Vibratory Gyroscope (CVG) control system and method which is able to estimate and cancel bias drift (the change in the gyroscope zero-rate output, which is a figure of merit (FOM) for gyroscopes) and separate the bias drift from the true input rotation rate (the latter is the quantity desired to be sensed by a gyroscope), as well as calibrate the CVG scale factor. Embodiments of this presentation use a specific mechanism of Partial Input Axis Reversal (PIAR) which applies to CVGs and is based on modulation of the damping axes to induce a partial reversal of the gyroscope input axis (as explained in detail later). Embodiments of this presentation also comprise a mechanism to measure and correct for Q/damping time constant variations for CVGs Embodiments of this presentation improve upon the prior art by eliminating the requirement to have an atomic clock or more stable frequency reference (although one may be still used if so desired for higher performance applications). Embodiments of this presentation provide alternate means of inducing an instantaneous bias in the CVG system by modulating the damping axes directly rather than inducing a frequency split to modulate the damping time constants.

An embodiment of this presentation comprises a CVG resonator control system where the outputs are fed back to the inputs so as to induce a damping term. According to embodiments of this presentation, the feedback is tunable by a gain parameter. According to embodiments of this presentation, the feedback is statically tuned to compensate for fabrication imperfections of the CVG resonator. According to embodiments of this presentation, the feedback is alternatively or additionally dynamically tuned based on a real-time estimate of the Q factors or damping time constants of the CVG resonator, to eliminate gyroscopic drift. According to embodiments of this presentation, a Q/damping time constant as measured by the control system, which may be absolute or relative depending on the modulating frequencies chosen. According to embodiments of this presentation, the modulating signal used to extract the Q factor can be FM modulated or AM modulated. According to embodiments of this presentation, one or more modulating signals can be used to simultaneously extract the 4 components of a Q/damping time constant matrix of the CVG. According to embodiments of this presentation, a control over the damping time constant can be used to induce a desired case drift, or rotation rate, on the CVG. According to embodiments of this presentation, the case drift can be used to perform a desired sweep of different gyroscope rates (for example sinusoidal or stepped or other) and then extract a scale factor from the CVG. According to embodiments of this presentation, control over the damping time constant split can be used to alternate the sign of the true gyroscope bias. According to embodiments of this presentation, a full mode reversal or a partial input axis reversal such as disclosed in U.S. application Ser. No. 16/673,878, by the same Applicant as the present application, can be used to separate the true input rotation rate from the true gyroscope bias of the CVG.

Another embodiment disclosed herein comprises a Coriolis Vibratory Gyroscope having: a resonator with first and second degenerate vibratory modes, wherein the first and second oscillator modes have different first and second damping rates; first and second drive circuits for causing the resonator to oscillate in the first and second modes in response to first and second drive signals; first and second sense circuits for generating first and second sense signals in response to the resonator oscillating in the first and second modes; a signal processing circuit arranged for generating the first and second drive signals, based on the first and second sense signals, such that: in a first operation state, where no rotation rate is input to the resonator, the first and second drive signals cause the resonator to oscillate only in the first mode at a first amplitude; and in a second operation state, where a rotation rate is input to the resonator, and couples a portion of the oscillation in the first mode into the second mode, the first and second drive signals bring back the oscillator into the first operation state; and first and second damping feedback circuits arranged for: generating first and second damping feedback signals proportional respectively to the first and second damping rates; and adding said first and second damping feedback signals to the first and second drive signals; as for example illustrated for example in FIG. 2, FIG. 3, FIG. 4, FIG. 5, FIG. 6, FIG. 8, FIG. 9, FIG. 10, FIG. 11, FIG. 12, FIG. 13.

According to embodiments of this presentation, said adding said first and second damping feedback signals to the first and second drive signals is such that the resonator has identical effective first and second damping rates on the first and second oscillator modes; as for example illustrated for example in FIG. 2, FIG. 3, FIG. 4, FIG. 5, FIG. 6, FIG. 8, FIG. 9, FIG. 10, FIG. 11, FIG. 12, FIG. 13.

According to embodiments of this presentation, one of the first and a second damping rates is null; or at least one of the first and a second damping rates varies with time; as for example illustrated in FIG. 2, FIG. 3, FIG. 4, FIG. 5, FIG. 6, FIG. 8, FIG. 9, FIG. 10, FIG. 11, FIG. 12, FIG. 13.

According to embodiments of this presentation, the first and second sense signals are proportional to the displacement of the resonator in the first and second modes, and the first and second damping feedback circuits generate the first and second damping feedback signals by deriving respectively the first and second sense signals and weighing them with first and second weighing factors, as for example illustrated in FIG. 2.

According to embodiments of this presentation, the first and second sense signals are proportional to the velocity of the displacement of the resonator in the first and second modes, and the first and second damping feedback circuits generate the first and second damping feedback signals by weighing respectively the first and second sense signals with first and second weighing factors, as for example illustrated in FIG. 4.

According to embodiments of this presentation, the CVG further comprises damping modulators arranged for modulating said first and second damping feedback signals before they are added to the first and second drive signals, such that the resonator has a controlled effective first damping rate and a controlled effective second damping rate; as for example illustrated in FIG. 2, FIG. 3, FIG. 4, FIG. 5, FIG. 6, FIG. 8, FIG. 9, FIG. 10, FIG. 11, FIG. 12, FIG. 13.

According to embodiments of this presentation, the damping modulators are arranged to control a change of the effective first and second damping rates that, in combination with the oscillation of the resonator, applies a controlled rotation rate to the resonator; as for example illustrated in FIG. 2, FIG. 3, FIG. 4, FIG. 5, FIG. 6, FIG. 8, FIG. 9, FIG. 10, FIG. 11, FIG. 12, FIG. 13.

According to embodiments of this presentation, the damping modulators are arranged for modulating the damping feedback signals with a dither signal; the CVG further comprising a demodulator for demodulating a measured rotation rate with said dither signal, thus allowing to measure the rotation rate due to the modulation of the damping feedback signals, and to determine a bias and scale factor of the resonator; as for example illustrated in FIG. 2, FIG. 3, FIG. 4, FIG. 5, FIG. 6, FIG. 8, FIG. 9, FIG. 10, FIG. 11, FIG. 12, FIG. 13.

According to embodiments of this presentation, the CVG further comprises third and fourth damping feedback circuits arranged for: generating third and fourth damping feedback signals proportional respectively to the first and second damping rates; and adding said third and fourth damping feedback signals to the second and first drive signals (so as to equalize the first and second damping rates); as for example illustrated in FIG. 6, FIG. 8, FIG. 9, FIG. 12, FIG. 13.

According to embodiments of this presentation, the first drive circuit comprises a first drive electrode aligned with a main axis of oscillation of the first mode; the second drive circuit comprises a second drive electrode aligned with a main axis of oscillation of the second mode; the first sense circuit comprises a first sense electrode aligned with a main axis of oscillation of the first mode; the second sense circuit comprises a second sense electrode aligned with a main axis of oscillation of the second mode; the first and second sense signals being proportional to the displacement of the resonator in the first and second modes; and the signal processing circuit comprises: a phase locked loop receiving in input the first sense signal, and generating in output an in-phase reference signal and a quadrature reference signal; an amplitude control loop receiving in input the first sense signal as well as a reference amplitude value, and generating in output an amplitude control signal, wherein the first drive signal is generated by modulating the amplitude control signal with the quadrature reference signal; a quadrature-control loop receiving in input the second sense signal and generating in output a quadrature control signal; and a rate control loop receiving in input the second sense signal and generating in output a rate control signal, wherein the second drive signal is generated by adding a modulation of the quadrature control signal with the in-phase reference signal, and a modulation of the rate control signal with the quadrature reference signal; as for example illustrated in FIG. 2, FIG. 3, FIG. 10.

According to embodiments of this presentation, the phase locked loop is arranged to demodulate the first sense signal with the quadrature reference signal, the amplitude control loop is arranged to demodulate the first sense signal with the in-phase reference signal, the quadrature control loop is arranged to demodulate the second sense signal with the quadrature reference signal, and the rate control loop is arranged to demodulate the second sense signal with the in-phase reference signal; as for example illustrated in FIG. 2, FIG. 3, FIG. 10.

According to embodiments of this presentation, the phase locked loop is arranged to integrate the quadrature-demodulated first sense signal and provide the integrated signal to a voltage-controlled oscillator that produces the in-phase reference signal and quadrature reference signal, the amplitude control loop is arranged to generate the amplitude control signal by integrating a comparison of the reference amplitude value with the in-phase demodulated first sense signal, the quadrature control loop is arranged to generate the quadrature control signal by integrating the quadrature-demodulated second sense signal, and the rate control loop is arranged to generate the rate control signal by integrating the in-phase demodulated second sense signal; as for example illustrated in FIG. 2, FIG. 3, FIG. 10.

According to embodiments of this presentation, the CVG further comprises third and fourth damping feedback circuits arranged for: generating third and fourth damping feedback signals proportional respectively to the first and a second damping rates, and adding said third and fourth damping feedback signals to the second and first drive signals, wherein said generating the third and fourth damping feedback signals proportional respectively to the first and a second damping rates comprises deriving respectively the first and second sense signals and weighing them with third and fourth weighing factors, as for example illustrated in FIG. 7.

According to embodiments of this presentation, the CVG further comprises damping modulators arranged for modulating said first, second, third and fourth damping feedback signals before they are added to the first and second drive signals, such that the resonator has a controlled effective first damping rate and a controlled effective second damping rate, as for example illustrated in FIG. 7.

According to embodiments of this presentation, said generating the first and second damping feedback signals proportional respectively to the first and second damping rates comprises in-phase-demodulating the first and second sense signals, and said adding the first and second damping feedback signals to the first and second drive signals comprises: a/ adding the in-phase-demodulated first and second sense signals, weighted by predetermined first and second weighing factors, to respectively the amplitude control signal and rate control signal. (FIG. 3); or b/ in-phase-demodulating the first sense signal, weighting the resulting signal by a predetermined first weighing factor and in-phase modulating the weighted signal before adding it to the first drive signal and in-phase-demodulating the second sense signal, weighting the resulting signal by a predetermined second weighing factor and adding the weighted signal to the quadrature control signal; as illustrated in FIG. 10.

According to embodiments of this presentation, the first and second damping feedback circuits are arranged to generate the first and second damping feedback signals by deriving respectively the first and second sense signals and weighing them with first and second weighing factors, as for example illustrated in FIG. 2.

According to embodiments of this presentation, the first drive circuit comprises a first drive electrode aligned with a main axis of oscillation of the first mode, the second drive circuit comprises a second drive electrode aligned with a main axis of oscillation of the second mode, the first sense circuit comprises a first sense electrode aligned with a main axis of oscillation of the first mode, the second sense circuit comprises a second sense electrode aligned with a main axis of oscillation of the second mode; the first and second sense signals being proportional to the velocity of the displacement of the resonator in the first and second modes, and the signal processing circuit comprises: a phase locked loop receiving in input the first sense signal, and generating in output an in-phase reference signal and a quadrature reference signal, an amplitude control loop receiving in input the first sense signal as well as a reference amplitude value, and generating in output an amplitude control signal, wherein the first drive signal is generated by modulating the amplitude control signal with the in-phase reference signal, a quadrature-control loop receiving in input the second sense signal and generating in output a quadrature control signal, and a rate control loop receiving in input the second sense signal and generating in output a rate control signal, wherein the second drive signal is generated by adding a modulation of the quadrature control signal with the quadrature reference signal, and a modulation of the rate control signal with the in-phase reference signal, as for example illustrated in FIG. 4, FIG. 5, FIG. 6, FIG. 8, FIG. 9, FIG. 11, FIG. 12, FIG. 13.

According to embodiments of this presentation, the phase locked loop is arranged to demodulate the first sense signal with the quadrature reference signal, the amplitude control loop is arranged to demodulate the first sense signal with the in-phase reference signal, the quadrature control loop is arranged to demodulate the second sense signal with the quadrature reference signal, and the rate control loop is arranged to demodulate the second sense signal with the in-phase reference signal, as for example illustrated in FIG. 4, FIG. 5, FIG. 6, FIG. 8, FIG. 9, FIG. 11, FIG. 12, FIG. 13.

According to embodiments of this presentation, the phase locked loop is arranged to integrate the quadrature-demodulated first sense signal and provide the integrated signal to a voltage-controlled oscillator that produces the in-phase reference signal and quadrature reference signal, the amplitude control loop is arranged to generate the amplitude control signal by integrating a comparison of the reference amplitude value with the in-phase demodulated first sense signal, the quadrature control loop is arranged to generate the quadrature control signal by integrating the quadrature-demodulated second sense signal, and the rate control loop is arranged to generate the rate control signal by integrating the in-phase demodulated second sense signal, as illustrated for example in FIG. 4, FIG. 5, FIG. 6, FIG. 8, FIG. 9, FIG. 11, FIG. 12, FIG. 13.

According to embodiments of this presentation, said generating the first and second damping feedback signals proportional respectively to the first and a second damping rates comprises in-phase-demodulating the first and second sense signals, and said adding the first and second damping feedback signals to the first and second drive signals comprises: a/adding the in-phase-demodulated first and second sense signals, weighted by predetermined first and second weighing factors, to respectively the amplitude control signal and rate control signal (as for example illustrated in FIG. 5, FIG. 6, FIG. 8, FIG. 9); or b/in-phase-demodulating the first sense signal, weighting the resulting signal by a predetermined first weighing factor and quadrature-phase modulating the weighted signal before adding it to the first drive signal and in-phase-demodulating the second sense signal, weighting the resulting signal by a predetermined second weighing factor and adding the weighted signal to the quadrature control signal (as for example illustrated in FIG. 11, FIG. 12, FIG. 13).

According to embodiments of this presentation, the CVG further comprises third and fourth damping feedback circuits arranged for: generating third and fourth damping feedback signals proportional respectively to the first and a second damping rates, and adding said third and fourth damping feedback signals to the second and first drive signals; and said generating the third and fourth damping feedback signals proportional respectively to the first and a second damping rates comprises in-phase-demodulating the first and second sense signals, and said adding the third and fourth damping feedback signals to the second and first drive signals comprises adding the in-phase-demodulated first and second sense signals, weighted by predetermined third and fourth weighing factors, to respectively the rate control signal and amplitude control signal, as for example illustrated in FIG. 6, FIG. 8, FIG. 9, FIG. 11, FIG. 12, FIG. 13.

According to embodiments of this presentation, the CVG further comprises damping modulators arranged for modulating said first, second, third and fourth damping feedback signals before they are added to the first and second drive signals, such that the resonator has a controlled effective first damping rate and a controlled effective second damping rate, as for example illustrated in FIG. 6, FIG. 8, FIG. 9, FIG. 12, FIG. 13.

According to embodiments of this presentation, the CVG further comprises: first and second amplitude modulators for amplitude-modulating respectively the amplitude control signal and rate control signal with a predetermined frequency before modulating the amplitude control signal and rate control signal with the in-phase reference signal, and first and second amplitude demodulators for demodulating respectively the in-phase demodulated first and second sense signals at said predetermined frequency, and a calculator arranged for calculating a quality factor of the resonator in the first and second modes using the outputs of the first and second amplitude demodulators, as illustrated for example in FIG. 8, FIG. 9, FIG. 13.

Other embodiments of this presentation relate to methods that comprise providing and operating the above described features.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
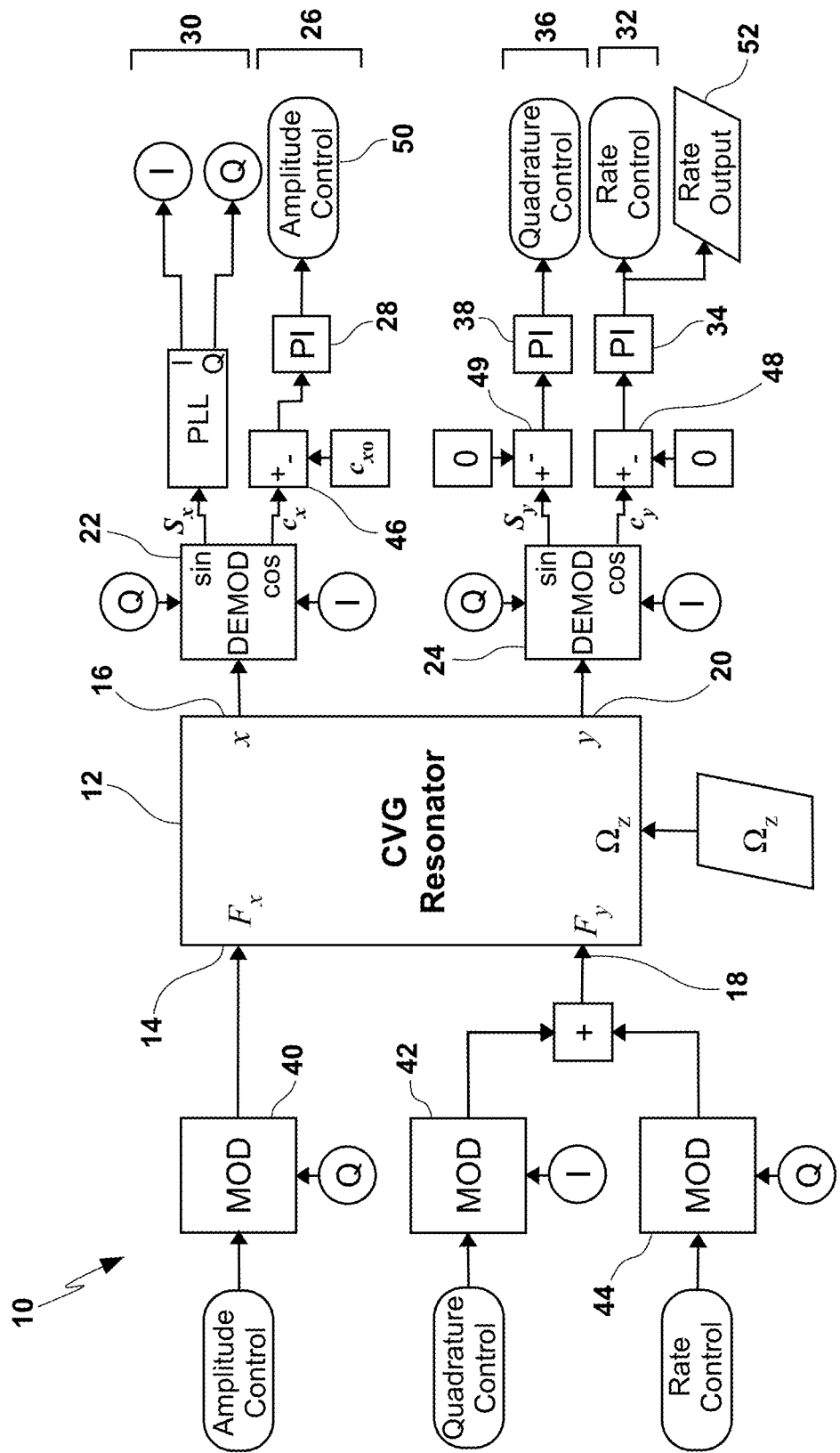
FIG. 1 illustrates a known CVG configured for a "force-to-rebalance" operation.

FIG. 1 illustrates schematically a Coriolis vibratory gyroscope (CVG) 10 that can be used in embodiments of this presentation. CVG 10 comprises a resonant structure (resonator) 12 that exhibits a degeneracy in its modal structure and comprises at least two modes (mode 1 and mode 2) at the same energy. Preferably, the two modes are of the second order or above, and the Coriolis force couples energy from one mode to another mode when a rotation rate is applied to resonator 12. It is to be noted that according to embodiments of this presentation, the modes could alternatively be first order, the downside to that being that they would be more sensitive to linear accelerations, so that would be a less preferable embodiment. According to embodiments of this presentation, the resonator can be an axisymmetric resonator and can comprise at least a first drive electrode 14 to drive oscillation of resonator 12 in the first mode, a first sense electrode 16 to sense a motion of resonator 12 along the first mode, a second drive electrode 18 to drive oscillation of resonator 12 in the second mode and a second sense electrode 20 to sense a motion of resonator 12 along the second mode. Resonator 12 can comprise a plane resonator having a periphery, for example having a generally circular shape, wherein first sensing electrode 16 and second sensing electrode 20 are arranged at a first distance of said periphery, and wherein first drive electrode 14 and second drive electrode 18 are arranged at a second distance of said periphery of said resonator. For example, first drive electrode 14 can be aligned with a major axis of the first mode, second drive electrode 18 can be aligned with the major axis of the second mode, first sensing electrode 16 can be aligned with the major axis of the first mode, and arranged diametrically opposed to first drive electrode 14; and second sensing electrode 20 can be aligned with the major axis of the second mode and arranged diametrically opposed to second drive electrode 18. First and second sense signals are generated at the first and second sense electrodes 16 and 20.

In a known operation of CVG 10, often called "force-to-rebalance" operation, mode 1 is driven to a fixed amplitude at a resonance frequency of mode 1, and mode 2 has no energy coupled into it unless there is a rotation rate applied. When a rotation rate is applied to resonator 12 and energy is coupled into mode 2, the CVG is arranged to apply a force to mode 2 to null the energy; and the amount of force that is applied is proportional to the input rotation rate. Four primary output signals are generated and monitored to maintain such full closed loop operation: A first primary output signal ($C_X$ in FIG. 1) is an in-phase demodulation (using a demodulator 22) of the first sense signal at the resonance frequency; a second primary output signal ($S_X$ in FIG. 1) is an out-of-phase demodulation (using demodulator 22) of the first sense signal; a third primary output signal ($C_Y$ in FIG. 1) is an in-phase demodulation (using a demodulator 24) of the second sense signal at the resonance frequency; a fourth primary output signal ($S_Y$ in FIG. 1) is an out-of-phase demodulation (using demodulator 24) of the second sense signal;

The four primary output signals $C_X$, $S_X$, $C_Y$, $S_Y$ can be low pass filtered (using low pass filters not illustrated in FIG. 1) and put into feedback control loops respectively for amplitude gain control (AGC, 26) eventually through a PI gain amplifier 28, phased lock loop (PLL, 30), force to rebalance (FTR, 32), eventually through a PI gain amplifier 34, and closed loop quadrature (CLQ, 36), eventually through a PI gain amplifier 38. Details about a CVG 10 such as illustrated in FIG. 1 can for example be found in the reference "*Coriolis Vibratory Gyros*", by D. D. Lynch, Symposium Gyro Technology 1998 Stuttgart, Germany, which is hereby incorporated by reference in its entirety.

It has been noted, based on the 1998 Lynch reference above, that the first and second sense signals x, y follow the following equations:

$$\ddot{x} - k(2\Omega\dot{y} + \dot{\Omega}y) + \frac{2}{\tau}\dot{x} + \Delta\left(\frac{1}{\tau}\right)(\dot{x}\cos2\theta_\tau + \dot{y}\sin2\theta_\tau) +$$
$$(\omega^2 - k'\Omega^2)x - \omega\Delta\omega(x\cos2\theta_\omega + y\sin2\theta_\omega) = f_x + \gamma_x g_x$$

$$\ddot{y} + k(2\Omega\dot{x} + \dot{\Omega}x) + \frac{2}{\tau}\dot{y} - \Delta\left(\frac{1}{\tau}\right)(-\dot{x}\sin2\theta_\tau + \dot{y}\cos2\theta_\tau) +$$
$$(\omega^2 - k'\Omega^2)y + \omega\Delta\omega(-x\sin2\theta_\omega + y\cos2\theta_\omega) = f_y + \gamma_y g_y;$$

where $$\omega^2 = \frac{\omega_1^2 + \omega_2^2}{2}; \quad \frac{1}{\tau} = \frac{1}{2}\left(\frac{1}{\tau_1} + \frac{1}{\tau_2}\right)$$

$$\omega\Delta\omega = \frac{\omega_1^2 - \omega_2^2}{2}; \quad \Delta\left(\frac{1}{\tau}\right) = \frac{1}{\tau_1} - \frac{1}{\tau_2}$$

The preceding equations represent a coupled, 2 degree-of-freedom (DOF) oscillator system, where the coupling rate is primarily determined by the input rotation rate $\Omega$, or alternatively explicitly labeling the out-of-plane rotation input axis, $\Omega z$. In an ideal CVG resonator in steady state conditions, many of the terms represent errors and can be set equal to zero. For purposes of clearly describing this presentation, an ideal, tuned (zero frequency split, represented by $\Delta\omega=0$) CVG resonator operated in steady state is assumed with small input rate such that $\Omega^2$ is also approximately zero, and the CVG has no sensitivity to specific gravity inputs ($\gamma\_\{x,y\}->0$).

Also assuming for the time being that $\theta\tau$ is zero, the x and y equations above can be simplified to:

$$\ddot{x} - 2k\Omega\dot{y} + \frac{2}{\tau_x}\dot{x} + \omega^2 x = f_x$$

$$\ddot{y} + 2k\Omega\dot{x} + \frac{2}{\tau_y}\dot{y} + \omega^2 y = f_y$$

In this situation, the system appears as two harmonic oscillators cross-coupled by the input rotation rate in proportion to the velocity of the other oscillator mode, with the coupling rate determined by the constant k, which is determined by the CVG resonator design and is known as the angular gain factor. The proportional constant on x' and y', $2/\tau(x, y)$ represents the damping rate, and $\tau$ is the decay time constant (how long it takes one of the oscillator modes to decay to 1/e of its initial amplitude). In general, the damping rate is not equal between the two oscillator modes, even if $\theta\tau=0$. As discussed in detail later, a first novel aspect of embodiments of this presentation relates to additional control loops which are used to generate specific forces f(x,y) on the respective oscillator modes such that $\tau(x, y)$ are equalized.

Returning to FIG. 1, it appears from the above discussion of the CVG dynamics that the CVG resonator block accepts two forces f(x,y) as input, and produces (x, y) oscillator mode signals as output. The CVG resonator block further accepts $\Omega z$, the external applied rotation rate as input. In general, (x, y, $\Omega z$) are time dependent signals, sometimes denoted explicitly as (x(t), y(t), $\Omega z(t)$). The CVG resonator is parameterized by additional parameters in accordance with the Lynch model, for example, (k, $\tau_x$, $\tau_y$, $\phi$), among other parameters as defined in the Lynch model.

In the Lynch model, and as shown in FIG. 1, two control loops 26 and 30 are closed around the x oscillator mode. First, assuming a constant initial amplitude in the oscillator mode, a Phase-Locked Loop (PLL) 30 is implemented to generate in-phase (I) and quadrature (Q) reference signals, which are used to modulate (modulator blocks 40, 42, 44) low bandwidth near DC signals to be applied as AC sinusoidal forces to the CVG resonator at its resonance frequency, or to demodulate (demodulator blocks 22, 24) the AC CVG resonator outputs at the resonance frequency back to low bandwidth near DC in-phase and quadrature amplitudes. Various techniques may be used to implement the PLL. In some embodiments, as shown in FIG. 1, the PLL is implemented after demodulation of the x oscillator mode signal, the quadrature amplitude $S_X$ of which is proportional to the phase error between the PLL generated reference signals and the x oscillator mode signal. The PLL's job is to drive this phase error to zero, at which point the I reference signal will be in phase with the x oscillator mode signal, and the quadrature amplitude $S_X$ will be zero and the in-phase amplitude $C_X$ will be maximized. If the frequency of the CVG resonator doesn't change, and the amplitude of $S_X$ is null, then the frequency of the PLL's output will remain unchanged. However, if the frequency of the CVG resonator changes (e.g., due to a change of temperature), then the PLL's output frequency will be driven to change to maintain the amplitude of $S_X$ at null. In other words, sometimes the PLL's output frequency has to change to maintain the $S_X$ at null state, which occurs when the PLL's output frequency matches the CVG resonator's frequency.

A second control loop closed around the x oscillator mode is an Amplitude Control loop 26, sometimes called an Automatic Gain Control (AGC) loop or an Automatic Level Control (ALC) loop. For this loop, as shown in FIG. 1, the in-phase amplitude $C_X$ is generated by the upper demodulation block 22, and is then compared to a desired set point $C_{x0}$ by an Add/Subtract block 46 to generate an error signal (the difference between the current in-phase amplitude $C_X$ and the desired set point $C_{x0}$). This error signal is received by a Proportional-Integral Controller (PI block 28). Alternatively, a Proportional-Integral-Derivative/PID Controller may also be employed. Alternatively, more advanced controllers depending on the particular needs of the given CVG system can also be used. The PI block 28 generates an Amplitude Control feedback signal 50, which is wrapped around from the right side of FIG. 1 to the left side as indicated by the labelled ovals. This Amplitude Control feedback signal 50 becomes the modulation amplitude for the upper MOD block 40, which is fed the quadrature reference signal Q generated by the PLL loop 30 to perform the modulation function. The Amplitude Control modulated output becomes the signal that is fed to the Fx input of CVG resonator 12, closing the loop.

If the in-phase amplitude $C_X$ is initially zero (or a small initial value so that the PLL can lock to the x oscillator mode frequency), the PI Controller block will drive the error signal to zero, resulting in a steady state condition where the in-phase amplitude $C_X$ is equal to the desired set point $C_{x0}$. The x oscillator mode modulator block 40 requires the quadrature reference signal Q because the CVG resonator 12 as depicted imparts a 90 degree phase shift at the x oscillator mode resonance frequency. The P coefficient of the PI Controller block 28, in combination with the 90 degree phase shift provided by the x oscillator mode at resonance and the +/−90 degree phase shift, can be adjusted in sign as necessary to provide a multiple of 360 degrees (N*360°, where N=0, 1, 2, . . . ) for the overall Amplitude Control loop 26, ensuring the necessary condition for sustaining oscillation.

FIG. 1 further illustrates two control loops 32 and 36 that are closed around the y oscillator mode operate similarly to the Amplitude Control loop 26, and are called the Quadrature Control loop 36 and the Rate Control loop 32. The Rate Control loop 32 is sometimes alternately referred to as a Force-to-Rebalance, or FTR, loop. For brevity, a block by block description of loops 32 and 36 is omitted since they are very similar in structure to the Amplitude Control loop 26. The main differences are:

(1) the Quadrature Control loop 36 takes the in-phase reference signal I as its modulation reference while the Rate Control loop 32 takes the quadrature phase reference signal Q as its modulation reference for the same reason as the Amplitude Control loop 26;

(2) the outputs of both Quadrature Control and Rate Control modulation blocks 42 and 44 are summed together before being applied to the CVG resonator input 18 (Fy);

(3) the target set points in both loops 32 and 36 are set to zero, for example using signal subtractors 48 and 49; and (4) the output of the Rate Control loop PI Controller block 34 is taken as the Rate Output 52, which is the CVG system's estimate of the true rotation rate being applied to the CVG Resonator 12. That is, the Rate Output 52 is the CVG system's measurement of Ωz.

Figure 2:
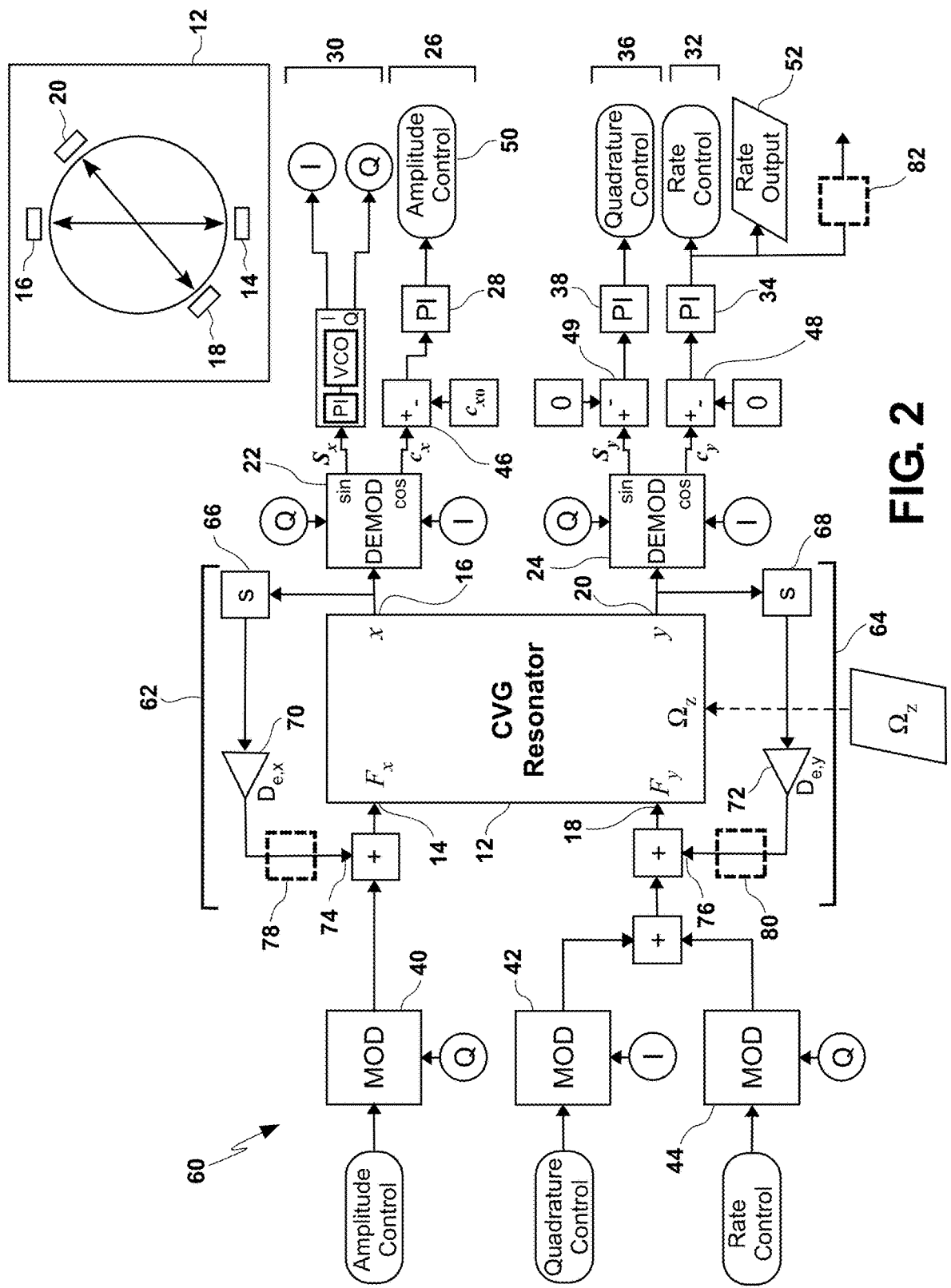
FIG. 2 illustrates a CVG according to embodiments of this presentation.
Figure 3:
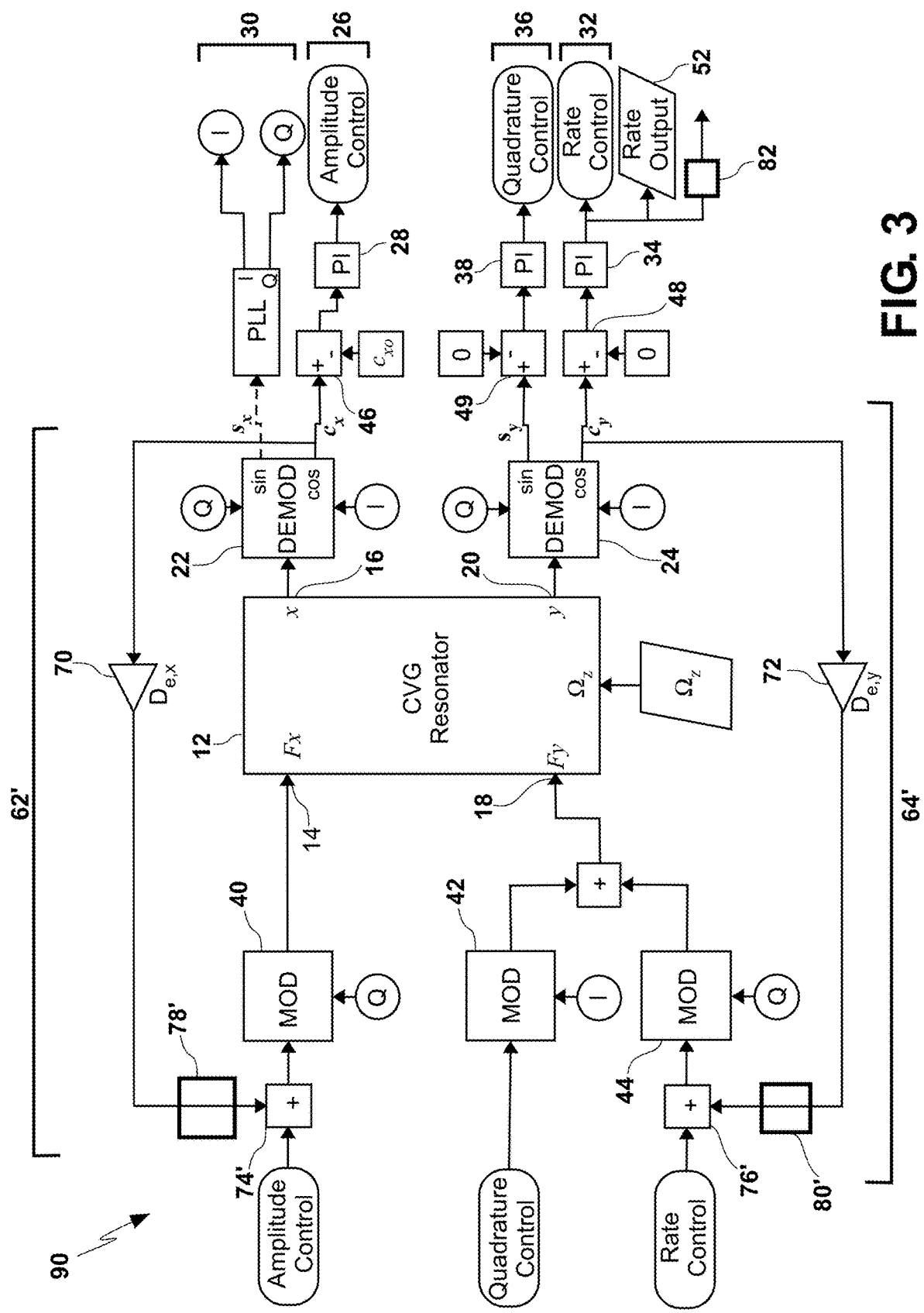
FIG. 3 illustrates another CVG according to embodiments of this presentation.
Figure 4:
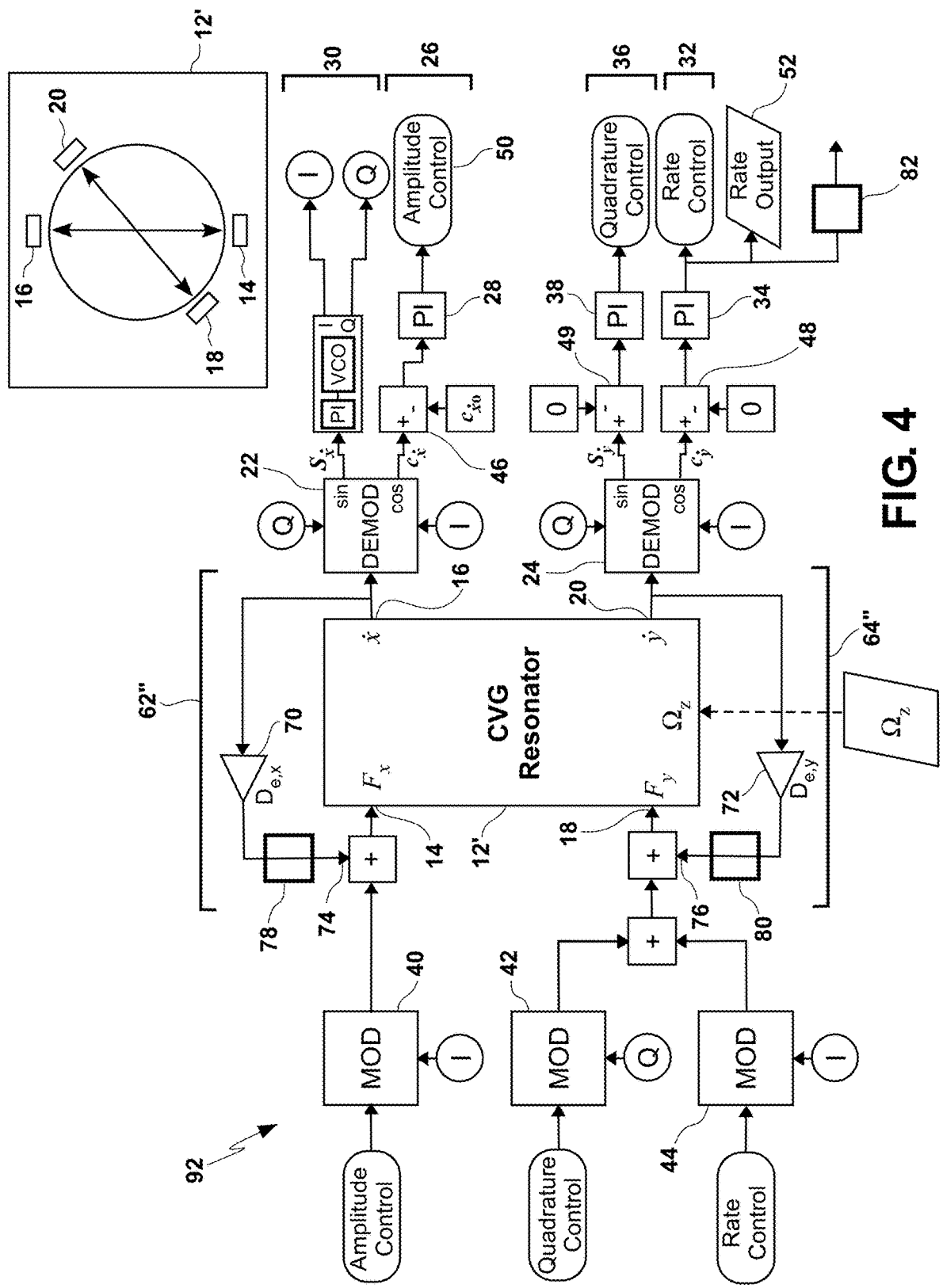
FIG. 4 illustrates another CVG according to embodiments of this presentation.
Figure 5:
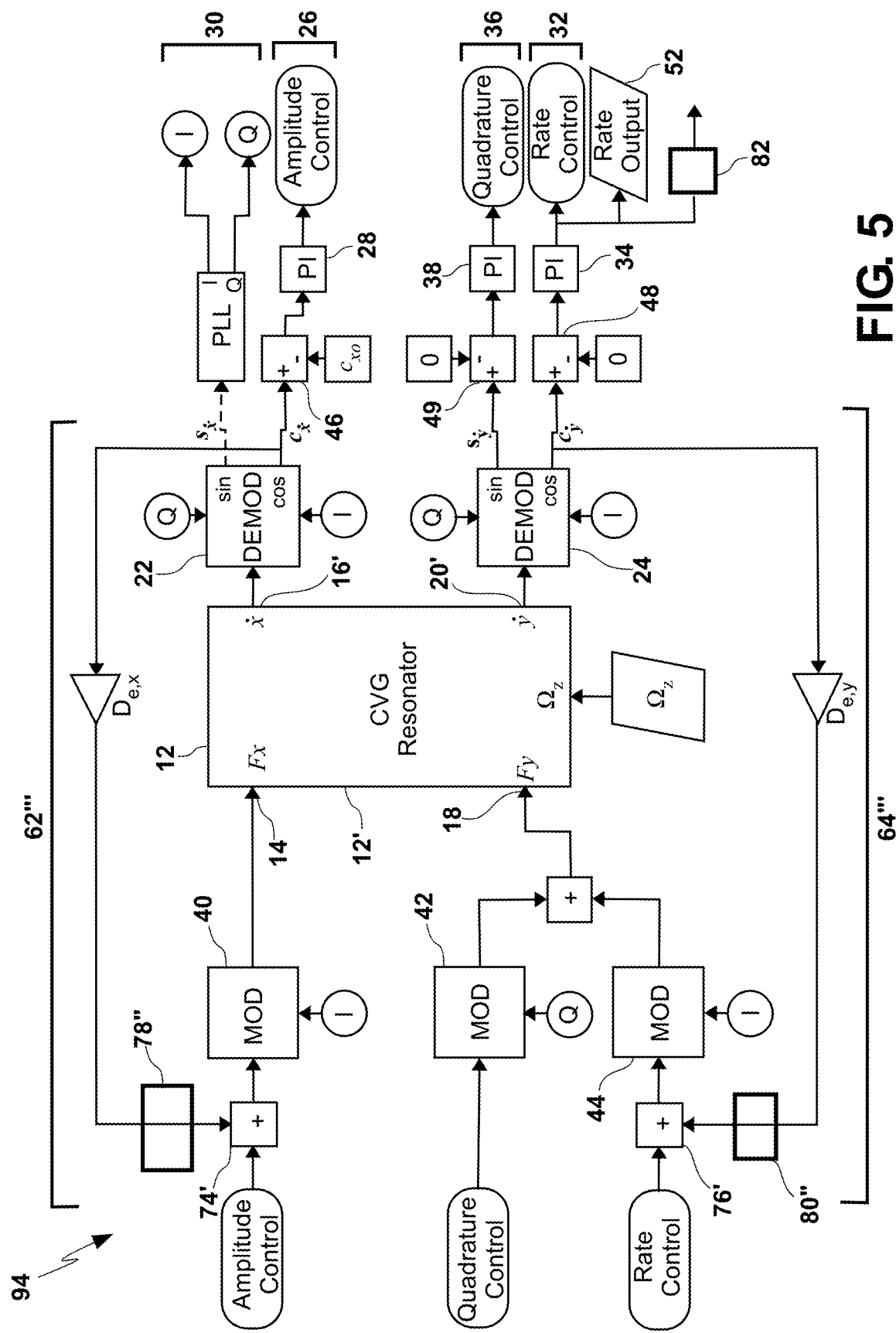
FIG. 5 illustrates another CVG according to embodiments of this presentation.

With the above description of the Lynch model as a starting point, various embodiments of this presentation will now be described. FIGS. 2 and 3 show embodiments of this presentation for CVG resonators which produce output signals in proportion to their oscillation mode displacements, as in the Lynch model; and FIGS. 4 and 5 show embodiments of this presentation for CVG resonators which produce output signals in proportion to their oscillation mode velocities. In general, embodiments of this presentation add electronic damping feedback loops to the CVG to balance the damping constants and damping times of both the x and y oscillator modes simultaneously. In one set of embodiments, the electronic damping is added to the oscillation mode with the least damping, while the other oscillation mode is kept at its intrinsic damping level (electronic damping constant set to 0, or electronic damping loop disabled), with the oscillation mode that intrinsically has the least damping requiring the most electronic damping to balance the two damping rates, while the oscillation mode that has the most intrinsic damping still has extra electronic damping added to it to bring the overall damping rates to the same level. The latter embodiments may be preferred in situations where the intrinsic damping is subject to fluctuations, in which case adding extra electronic damping to both oscillation modes may be used to stabilize the damping fluctuations by allowing the novel damping control loops to maintain constant overall damping rates.

A further aspect of this presentation builds on the previous electronic damping feedback loop concept to provide a function of continuous online self-calibration. A novel concept here is to add a modulation signal to the electronic damping rate in the electronic damping feedback loop on one or both oscillation modes. Since the damping rates are well known, this allows creating a well-known change in the damping rates as well. Changing the damping rates in a known manner enables one to impart a known rotation rate signal to the CVG resonator through an effect known as Case drift. Case drift is traditionally understood as a true rotation of the vibration mode pattern angle of the CVG system due to a difference in damping between the location of the highest damping in the CVG resonator and the lowest damping in the CVG resonator. The energy imparted by the control system appears to leak out of the highest damping axis, while remaining longer in the lowest damping axis, and this is indistinguishable from a true rotation rate in the CVG resonator (hence, the term Case drift, or drift of the pattern angle relative to the gyro case toward the axis of least damping).

Embodiments of this presentation employ this effect in a novel way to achieve control of gyro bias drift. Since we are now able to control the damping in each oscillation mode via electronic feedback, modulation of the relative damping axes enables to move the CVG system pattern angle in a controlled manner and thus to induce known rotation rates at well which are in superposition to the true rate. Thus, it becomes possible to simultaneously calibrate the gyro while it is being used to measure the externally applied rate. The mathematics underlying this concept will be presented below. The figures describing various embodiments of electronic damping feedback will now be described in detail.

FIG. 2 illustrates a CVG 60 with electronic damping feedback according to an embodiment of this presentation. This embodiment is similar to the CVG 10 illustrated in FIG. 1, and the same references relate to the same circuit elements in the figures. A difference between CVG 60 and CVG 10 lies in the addition of damping feedback paths 62 and 64 on the x and y oscillation modes. According to this embodiment, damping feedback paths 62 and 64 are tapped off at the oscillation mode outputs 16 (*x*) and 20 (*y*), are fed each into a derivative block 66 and 68 (labeled s to represent the derivative operation in the Laplace domain) to generate a signal proportional to the oscillation mode velocity, and are then multiplied by a damping gain in a multiplier 70, 72, before being added as damping feedback signals 74, 76 to the outputs of the modulation blocks 40 on one hand and 42, 44 on the other hand, and thus applied to the CVG resonator force inputs 14 and 18. The electronic damping gains, De,{x,y}, (or "weighing factors") provided by multipliers 70 and 72 may have positive or negative sign as needed to provide the appropriate phase of the feedback to generate a damping effect. Further, the electronic damping gains, De,{x,y} may be constant or adjustable. By selecting appropriate values of De,{x,y}, the damping rates of the two CVG resonator oscillation modes can be matched, and the damping rate can be made higher than the intrinsic level of either oscillation mode as described previously. Further, either or both De,{x,y} can be modulated such that the CVG system pattern angle can be swept between alignment with the x oscillation mode and alignment with the y oscillation mode, and the rate of sweeping the pattern angle corresponds to different effective rotation rates applied to the CVG resonator.

CVG 60 can be described as comprising a resonator 12 having first and second degenerate vibratory modes, wherein the first and second oscillator modes have different first and second damping rates; as well as first and second drive circuits (40; 42, 44) for causing the resonator 12 to oscillate in the first and second modes in response to first (Fx) and second (Fy) drive signals (on first and second drive electrodes 14, 18); and first and second sense circuits (26, 30; 32, 36) for generating first (x) and second (y) sense signals in response to the resonator oscillating in the first and second modes. CVG 60 further comprises a signal processing circuit (40, 42, 44, 26, 30, 32, 36) arranged for generating the first (Fx) and second (Fy) drive signals, based on the first (x) and second (y) sense signals, such that: in a first operation state, where no rotation rate is input from outside the CVG 60, the first (Fx) and second (Fy) drive signals cause the resonator 12 to oscillate only in the first mode at a first amplitude and does not oscillate in the second mode; and in a second operation state, where a rotation rate is input from outside CVG 60 and couples a portion of the oscillation in the first mode into the second mode, the first and second drive signals act to bring back the oscillator into the first operation state. Further, CVG 60 comprises first and second damping feedback circuits 62, 64 arranged for: generating first (74) and second (76) damping feedback signals proportional respectively to the first and second damping rates; and adding said first (74) and second (76) damping feedback signals to the first (Fx) and second (Fy) drive signals.

As outlined previously, the first (74) and second (76) damping feedback signals are such that their respective addition to the first (Fx) and second (Fy) drive signals causes the resonator 12 to have identical effective first and second damping rates on the first and second oscillator modes. This allows a balanced operation of CVG 60. For example, if the first damping rate is smaller than the second damping rate, the operation of adding the first and second damping feedback signals to the first and second drive signals so as to equalize the first and second damping rates can comprise adding damping to the first mode only. The balancing of operation can be achieved even if one of the first and second damping rate is null. The balancing of operation can be achieved even if at least one of the first and second damping rate varies with time. In such a case, at least one of the first and second damping feedback signals also varies with time to have constant identical effective first and second damping rates (i.e. the intrinsic damping rates plus their correction by the damping feedback signals) on the first and second oscillator modes.

According to embodiments of this presentation and as illustrated in FIG. 2, the first (x) and second (y) sense signals are generated proportional to the displacement of the resonator 12 in the first and second modes. In such a case the first (62) and second (64) damping feedback circuits generate the first (74) and second (76) damping feedback signals by deriving (in derivative blocks 66, 68) respectively the first (x) and second (y) sense signals and weighing them (in multipliers 70, 72) with first and second weighing factors ($D_{e,x}$; $D_{e,y}$).

As illustrated in the top left corner of FIG. 2, the resonator 12 can comprise a rotationally symmetric resonating plate having drive and sense electrodes arranged at its periphery. As illustrated in FIG. 2 with respect to such an arrangement, the first drive electrode 14 can be aligned with a main axis of oscillation of the first mode of resonator 12, the second drive electrode 18 can be aligned with a main axis of oscillation of the second mode of resonator 12, the first sense electrode 16 can be aligned with the main axis of oscillation of the first mode, opposite first drive electrode 14, and the second sense electrode 20 can be aligned with the main axis of oscillation of the second mode, opposite second drive electrode 18.

If, as illustrated in FIG. 2, the first and second sense signals x, y are proportional to the displacement of the resonator 12 in the first and second modes, the signal processing circuit can comprises: a phase locked loop (30) receiving in input the first sense signal (x), and generating in output an in-phase reference signal (I) and a quadrature reference signal (Q); an amplitude control loop (26) receiving in input the first sense signal (x) as well as a reference amplitude value (Cx0), and generating in output an amplitude control signal 50, wherein the first drive signal Fx is generated by modulating the amplitude control signal 50 with the quadrature reference signal Q. The signal processing circuit further comprises a quadrature-control loop (36) receiving in input the second sense signal y and generating in output a quadrature control signal; and a rate control loop 32 receiving in input the second sense signal y and generating in output a rate control signal, wherein the second drive signal Fy is generated by adding a modulation of the quadrature control signal with the in-phase reference signal I, and a modulation of the rate control signal with the quadrature reference signal Q.

According to embodiments of this presentation and as illustrated in FIG. 2, the phase locked loop 30 can be arranged to demodulate $S_X$ the first sense signal x with the quadrature reference signal Q; the amplitude control loop 26 can be arranged to demodulate $C_X$ the first sense signal x with the in-phase reference signal I; the quadrature control loop 36 can be arranged to demodulate $S_Y$ the second sense signal y with the quadrature reference signal Q; and the rate control loop 32 can be arranged to demodulate $C_Y$ the second sense signal y with the in-phase reference signal I.

According to embodiments of this presentation and as also illustrated in FIG. 2, the phase locked loop 30 can be arranged to integrate (pass through a PI block) the quadrature-demodulated first sense signal $S_X$ in a PI block and provide the integrated signal to a voltage-controlled oscillator that produces the in-phase reference signal I and quadrature reference signal Q; the amplitude control loop 26 can be arranged to generate the amplitude control signal by integrating (passing through a PI block) a comparison of the reference amplitude value Cx0 with the in-phase demodulated first sense signal Cx; the quadrature control loop 36 can be arranged to generate the quadrature control signal by integrating (passing through a PI block) a difference of the quadrature-demodulated second sense signal $S_Y$ and a reference signal (e.g. null); and the rate control loop 32 can be arranged to generate the rate control signal by integrating (passing through a PI block) a difference of the in-phase demodulated second sense signal $C_Y$ and a reference signal (e.g. null).

In a case where the first and second sense signals x, y are proportional to the displacement of the resonator 12 in the first and second modes, as for example illustrated in FIG. 2, the first and second damping feedback circuits can generally speaking be arranged to generate the first and second damping feedback signals by deriving respectively the first and second sense signals x, y and weighing them with first and second weighing factors.

Optionally, CVG 60 can comprise damping modulators 78, 80 arranged for modulating respectively the first and second damping feedback signals 74 and 76 before they are added to the first and second drive signals Fx, Fy, such that the resonator 12 has an effective first damping rate and an effective second damping rate that are both controlled by the modulation introduced by the damping modulators. In particular the damping modulators can be arranged to control a change of the effective first and second damping rates that, in combination with the oscillation of the resonator 12, applies a controlled rotation rate to the resonator 12. Advantageously, the damping modulators can be arranged for modulating the damping feedback signals 74, 76 with a dither signal and CVG 60 can comprise a demodulator 82 for demodulating the measured rotation rate 52 with said dither signal, thus allowing to measure the rotation rate due to the modulation of the damping feedback signals; and to determine a bias and scale factor of the resonator. Thus, it becomes possible to simultaneously calibrate the gyro while it is being used to measure the externally applied rate.

FIG. 3 illustrates a CVG 90 with electronic damping feedback according to another embodiment of this presentation, where instead of directly feeding back the oscillator mode velocity signals to the force inputs, the demodulated amplitude is fed back, scaled by De,{x,y}, summed with the other control loop signals as appropriate, and then modulated in the appropriate phase to produce the intended damping effect. This embodiment is similar to the CVG 60 illustrated in FIG. 2, and the same references relate to the same circuit elements in the figures. CVG 90 differs from CVG 60 mainly in that CVG 90 has feedback loops 62', 64' that generate a first damping feedback signal 74' and a second damping feedback signal 76', proportional respectively to the first and second damping rates, by in-phase-demodulating (in demodulators 22, 24) the first and second sense signals (x and y) rather than deriving them as in CVG 60. Further, CVG 90 adds the first and second damping feedback signals 74', 76' to the first and second drive signals Fx, Fy by adding the in-phase-demodulated first and second sense signals, weighted by predetermined first and second weighing factors (by multipliers 70, 72), to respectively the amplitude control signal of loop 26 and the rate control signal of the loop 32. Modulators 78 and 80 of FIG. 2 are replaced by modulators 78', 80' adapted to the way the damping feedback signals 74', 76' are generated in CVG 90.

FIG. 4 illustrates a CVG 92 with electronic damping feedback according to another embodiment of this presentation, where CVG resonator 12' provides velocity output signals x', y' instead of motion signals x, y as resonator 12. FIG. 4 is similar to FIG. 2, with the exception that the derivative blocks 66, 68 are no longer needed since a velocity output can be obtained directly.

Because in FIG. 4 the first and second sense signals x', y' are proportional to the velocity of the displacement of the resonator 12' in the first and second modes, the first and second damping feedback circuits/loops 62", 64" generate the first and second damping feedback signals 74, 76 by weighing respectively the first and second sense signals x', y' with first and second weighing factors using the multipliers 70, 72. Otherwise, CVG 92 can be identical to CVG 60.

As illustrated in the top right corner of FIG. 4, and consistently with FIG. 2, the first drive circuit of the CVG 92 comprises a first drive electrode 14 aligned with a main axis of oscillation of the first mode of resonator 12', the second drive circuit of CVG 92 comprises a second drive electrode 18 aligned with a main axis of oscillation of the second mode of resonator 12'. Consistently, the first sense circuit of CVG 92 comprises a first sense electrode 16 aligned with the main axis of oscillation of the first mode, for example diametrically opposed to electrode 14 on the periphery of a vibrating plate (circular plate illustrated) of resonator 12'; and the second sense circuit of CVG 92 comprises a second sense electrode 20 aligned with the main axis of oscillation of the second mode of resonator 12'; wherein the first and second sense signals are proportional to the velocity of the displacement of the resonator 12' in the first and second modes. The electrodes can be arranged to provide a response proportional to velocity due to the use of a resistive transimpedance amplifier (TIA) circuit. The TIA can then convert the motion of the resonator through a polarized gap (voltage differential applied across the plates), which generates a displacement current proportional to the resonator velocity in the gap, which can then be converted to an output voltage by the transimpedance amplifier. There are alternate circuits that could be used to generate an output voltage that is proportional to the displacement of the resonator motion through the gap (e.g., a TIA with capacitive feedback, or capacitive sensing amplifier based on switching; see for example (https://research.ece.cmu.edu/~mems/pubs/pdfs/ieee/jssc/0193_wu-2004.pdf), or applying an AC field across the gap to measure the capacitance (https://www.electronicdesign.com/technologies/analog/article/21796004/use-analog-techniques-to-measure-capacitance-in-capacitive-sensors))

Further, the signal processing circuit of CVG 92 comprises: a phase locked loop 30 receiving in input the first sense signal x', and generating in output an in-phase reference signal I and a quadrature reference signal Q; an amplitude control loop 26 receiving in input the first sense signal x' as well as a reference amplitude value Cx'0, and generating in output an amplitude control signal, wherein the first drive signal Fx is generated by modulating the amplitude control signal with the in-phase reference signal I. CVG 92 also comprises a quadrature-control loop 36 receiving in input the second sense signal y' and generating in output a quadrature control signal; and a rate control loop 32 receiving in input the second sense signal y' and generating in output a rate control signal 52, wherein the second drive signal is generated by adding a modulation of the quadrature control signal with the quadrature reference signal Q, and a modulation of the rate control signal with the in-phase reference signal I.

According to embodiments of this presentation, the phase locked loop 30 is arranged to demodulate the first sense signal x' with the quadrature reference signal Q (thus generating Sx'); the amplitude control loop 26 is arranged to demodulate the first sense signal x' with the in-phase reference signal I (thus generating Cx'); the quadrature control loop 36 is arranged to demodulate the second sense signal y' with the quadrature reference signal Q (thus generating Sy');

and the rate control loop 32 is arranged to demodulate the second sense signal y' with the in-phase reference signal I (thus generating Cy').

According to embodiments of this presentation, the phase locked loop 30 is arranged to integrate (for example going through a PI block) the quadrature-demodulated first sense signal Sx' and provide the integrated signal to a voltage-controlled oscillator VCO that produces the in-phase reference signal I and quadrature reference signal Q. Further, the amplitude control loop 26 is arranged to generate the amplitude control signal by integrating (for example going through PI block 46) a comparison (for example using subtractor 46) of the reference amplitude value Cx'0 with the in-phase demodulated first sense signal Cx'; the quadrature control loop 36 is arranged to generate the quadrature control signal by integrating (for example going through PI block 49) the quadrature-demodulated second sense signal Sy' (or a difference of said signal and a reference signal as illustrated in FIG. 4); and the rate control loop 32 is arranged to generate the rate control signal by integrating (for example going through PI block 48) the in-phase demodulated second sense signal Cy' (or a difference of said signal and a reference signal as illustrated in FIG. 4).

Consistently with the first and second damping feedback circuits 62 and 64 of FIG. 2, the first and second damping feedback circuits 62" and 64" can comprise modulators 78, 80 arranged to modulate the signals 74, 76 to achieve a desired control of the damping such as detailed with respect to FIG. 2, for example to apply a controlled rotation rate to the resonator 12'.

FIG. 5 illustrates a CVG 94 with electronic damping feedback according to another embodiment of this presentation, where CVG resonator 12' is the same as in FIG. 4. It follows that CVG 94 is similar to CVG 90 of FIG. 3, with the exception that the first and second damping feedback circuits/loops 62''', 64''' are adjusted to reflect that the CVG resonator 12' is producing a velocity output instead of a displacement output.

Due to the differences between CVG 94 and CVG 92 and as illustrated in FIG. 5, the generating of the first and second damping feedback signals 74', 76' by CVG 94, proportional respectively to the first and a second damping rates comprises in-phase-demodulating (in demodulators 22, 24, thus generating Cx', Cy') the first and second sense signals x', y'; and the adding of the first and second damping feedback signals 74', 76' to the first and second drive signals Fx, Fy comprises adding the in-phase-demodulated first and second sense signals Cx', Cy', weighted by predetermined first and second weighing factors (De,x; De,y), to respectively the amplitude control signal and the rate control signal. Consistently with the first and second damping feedback circuits 62 and 64 of FIG. 2, the first and second damping feedback circuits 62''' and 64''' can comprise modulators 78", 80" arranged to modulate the signals 74', 76' to achieve a desired control of the damping such as detailed with respect to FIG. 2, for example to apply a controlled rotation rate to the resonator 12'.

The above embodiments have been described with CVG using two damping feedback circuits that generate each a damping feedback signal. However, in many situations it may be desirable to expand the electronic damping feedback to consider two additional terms/damping feedback signals to complete the damping feedback matrix. This is motivated by the Lynch model mentioned above, now retaining Θt and allowing it to be nonzero.

$$\ddot{x} - 2k\Omega\dot{y} + \frac{2}{\tau}\dot{x} + \Delta\frac{1}{\tau}\dot{x}\cos2\theta_\tau + \Delta\frac{1}{\tau}\dot{y}\sin2\theta_\tau + \omega^2 x = f_x$$

$$\ddot{y} + 2k\Omega\dot{x} + \frac{2}{\tau}\dot{y} + \Delta\frac{1}{\tau}\dot{x}\sin2\theta_\tau - \Delta\frac{1}{\tau}\dot{y}\cos2\theta_\tau + \omega^2 y = f_y$$

Figure 6:
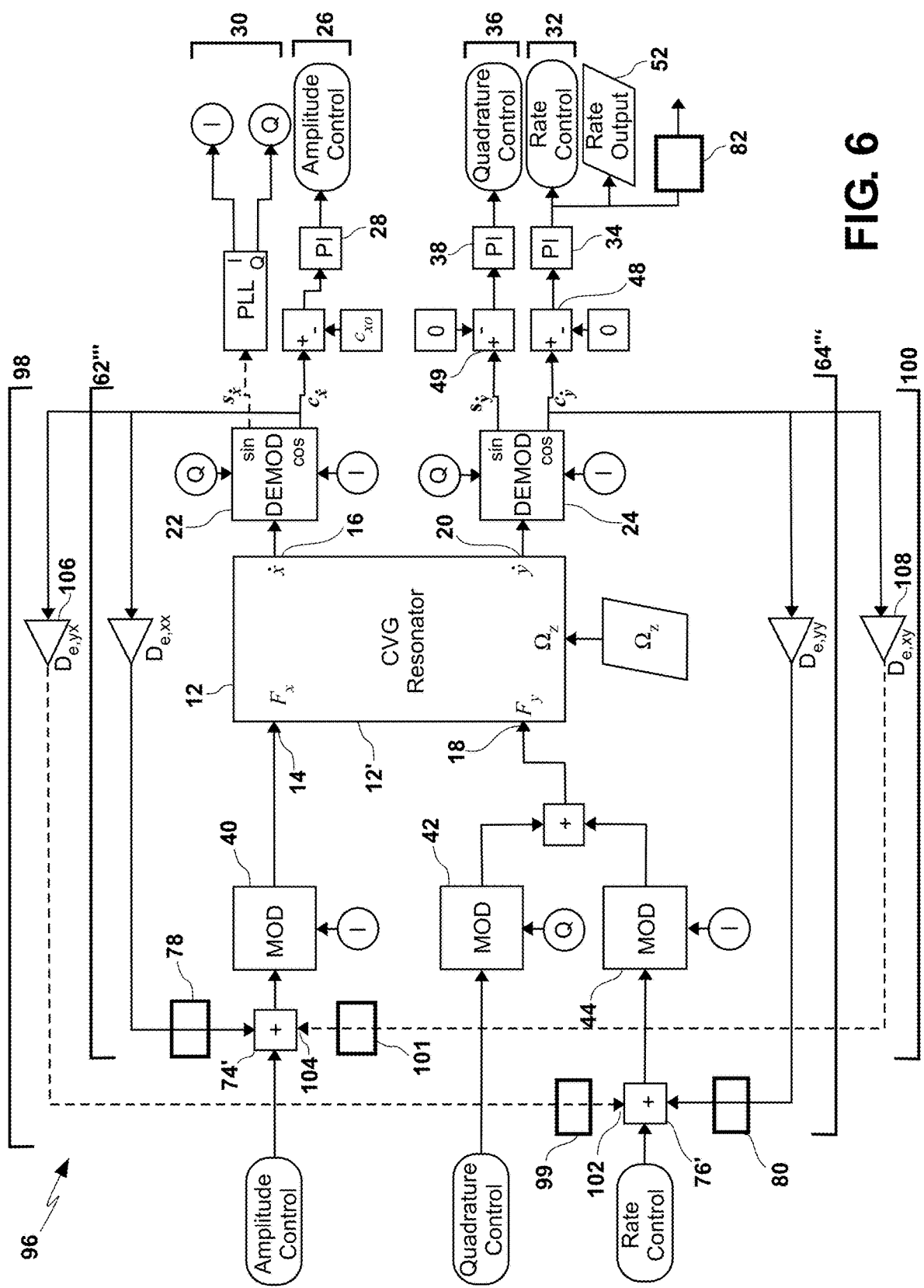
FIG. 6 illustrates another CVG according to embodiments of this presentation.

FIG. 6 illustrates an embodiment of a CVG 96 with electronic damping feedback analogous to CVG 94 of FIG. 5, but with the full Lynch damping error terms considered.

CVG 96 is essentially identical to CVG 94, but in addition it comprises a third damping feedback circuit/loop 98 and a fourth damping feedback circuit/loop 100. The third damping feedback circuit/loop 98 is arranged for generating a third damping feedback signal 102 proportional to the first damping rate; and for adding said third damping feedback signal 102 to the second drive signal Fy. Similarly, the fourth damping feedback circuit/loop 100 is arranged for generating a fourth damping feedback signal 104 proportional to the second damping rate; and for adding said fourth damping feedback signal 104 to the second drive signal Fx. According to embodiments of this presentation, the third and fourth damping feedback signals help equalize the first and second damping rates.

According to embodiments of this presentation, generating the third and fourth damping feedback signals 102, 104 proportional respectively to the first and a second damping rates respectively comprises in-phase-demodulating (in demodulators 22, 24, thus generating signals Cx, Cy) the first (x') and second (y') sense signals; and adding the third and fourth damping feedback signals 102, 104 to the second and first drive signals Fx, Fy comprises adding the in-phase-demodulated first (Cx) and second (Cy) sense signals, weighted (using multipliers 106, 108) by predetermined third and fourth weighing factors (De,yx and De,xy in FIG. 6), to respectively the rate control signal and amplitude control signal of loops 26 and 32. Consistently with the first and second damping feedback circuits 62''' and 64''', the third and fourth damping feedback circuits/loops 98, 100 can comprise modulators 99, 101 arranged to modulate the signals 102, 104 consistently with the modulation of signals 74', 76' to achieve a desired control of the damping such as detailed with respect to the previous figures, for example to apply a controlled rotation rate to the resonator 12'.

At this juncture, it must be noted that even though the third and fourth damping feedback circuits/loops 98, 100 are illustrated in FIG. 6 added to a CVG such as illustrated in FIG. 5, alternative third and fourth damping feedback circuits/loops can also be added to the CVGs illustrated in FIGS. 2 to 4, with appropriate amendments to match the structure of the first and second damping feedback circuits/loops of these figures.

Figure 7:
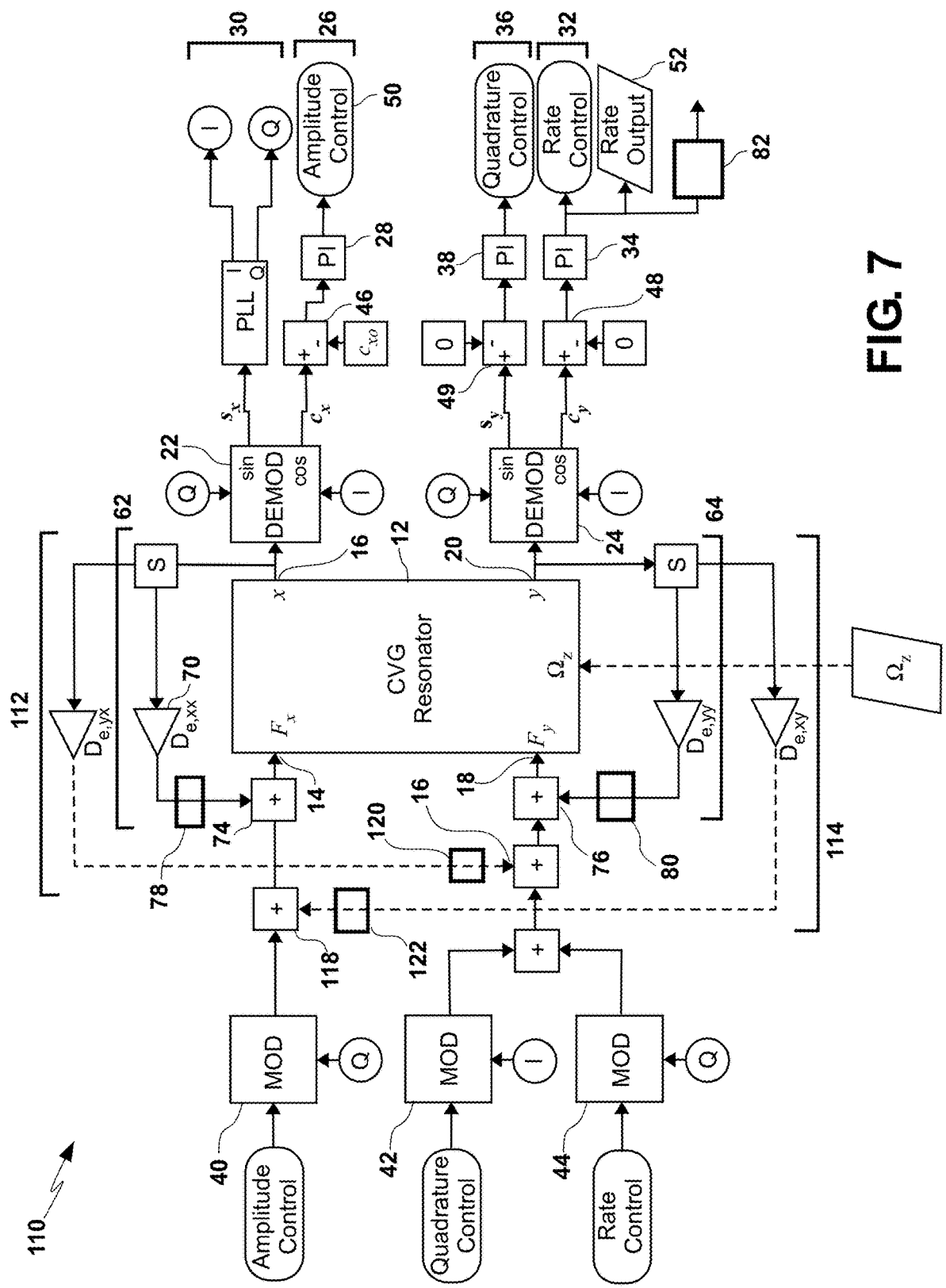
FIG. 7 illustrates another CVG according to embodiments of this presentation.

FIG. 7 illustrates a CVG 110 according to embodiments of this presentation, where third and fourth damping feedback circuits/loops 112, 114 generating third and fourth damping signals 116, 118 are added to a CVG 60 such as illustrated in FIG. 2. Consistently with the first and second damping feedback circuits 62 and 64 of FIG. 2, the third and fourth damping feedback circuits 112 and 114 can comprise modulators 120, 122 arranged to modulate the signals 116, 118 to achieve a desired control of the damping such as detailed with respect to FIG. 2, for example to apply a controlled rotation rate to the resonator 12.

Figure 8:
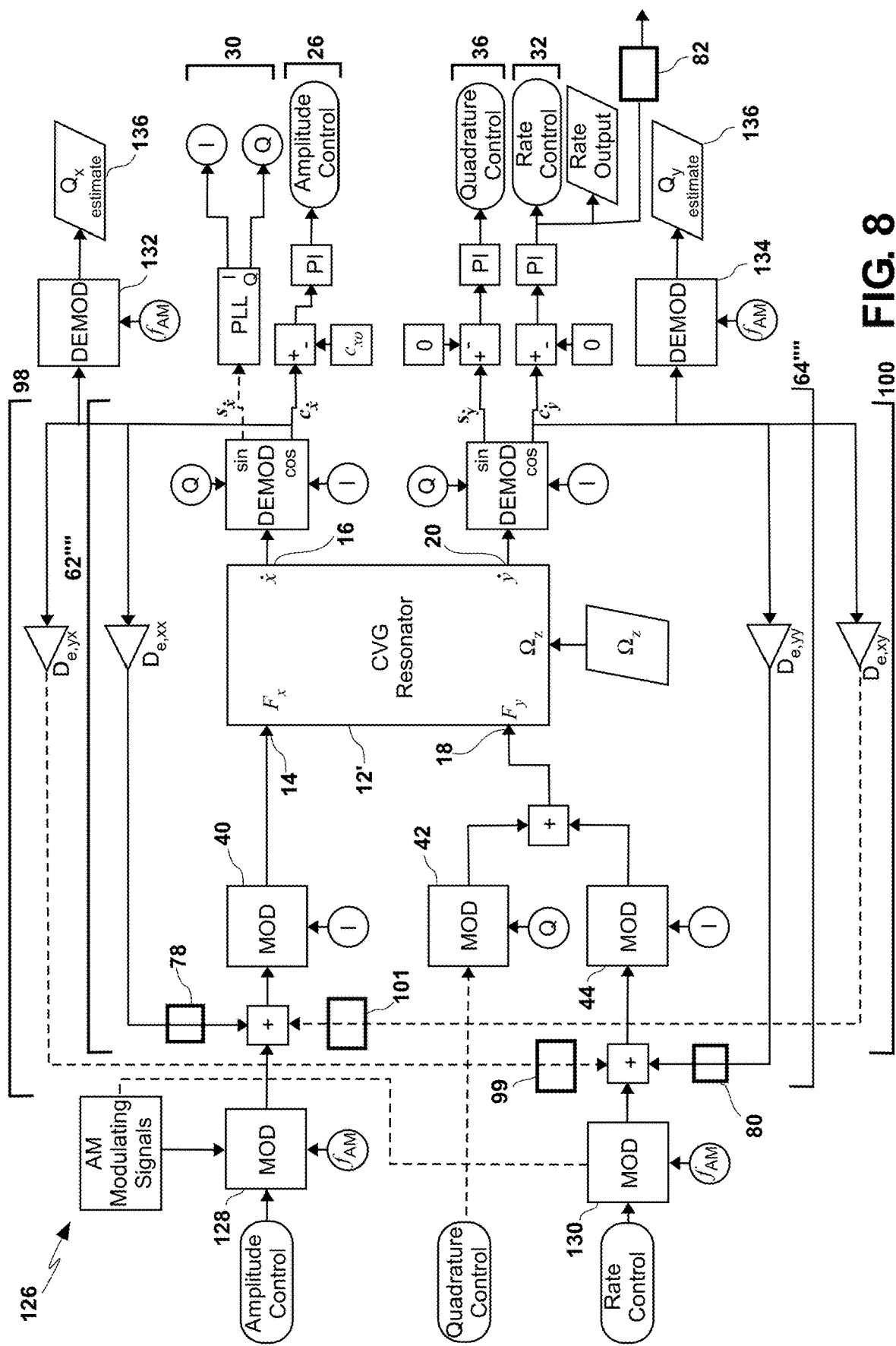
FIG. 8 illustrates another CVG according to embodiments of this presentation.

FIG. 8 illustrates a CVG 126 according to embodiments of this presentation, essentially identical to the CVG 96 of FIG. 6, with additionally some circuitry for Q extraction. Circuitry allowing feedback from Q extraction to electronic damping feedback coefficients can be provided but is not shown in the figures. According to embodiments of this presentation, the circuitry for Q extraction comprises first 128 and second 130 amplitude modulators for amplitude-modulating respectively the amplitude control signal and rate control signal of loops 26, 32 with a predetermined frequency fAM before modulating (in modulators 40 and 44) the amplitude control signal and rate control signal with the in-phase reference signal I. The circuitry for Q extraction can also comprise first 132 and second 134 amplitude demodulators for demodulating respectively the in-phase demodulated first Cx' and second Cy' sense signals at said predetermined frequency fAM; and a calculator 136 arranged for calculating a quality factor of the resonator in the first and second modes using the outputs of the first and second amplitude demodulators. Overall, a first calibration method of a CVG according to embodiments of this presentation comprises extracting a measure of the Q/damping rates in real time and then using that measurement to adjust the electronic damping feedback coefficients such that the bias drift due to damping rate fluctuation/drift goes to zero. Alternatively or in addition, a second method of calibration of way of a CVG according to embodiments of this presentation comprises applying a dither signal to the electronic damping feedback coefficients such that a known case drift/apparent rotation rate is induced, and the bias and scale factor can be extracted from the known apparent rotation rate. The starting point for both methods is a tuned CVG with $\Delta 1/\tau$ and $\theta\tau$ tuned to zero by adjusting the electronic damping feedback coefficients D_(e,{x,y}{x,y}) to the appropriate values.

For self-calibration method #1, the amplitude control and rate control signals feeding the I phase MOD blocks are amplitude modulated (AM) with, e.g., a sine wave. The AM modulating signal may be at an offset frequency within the bandwidth of the CVG resonator oscillator modes, or it may be at an offset frequency outside the bandwidth of the CVG resonator oscillator modes. In the first case, a relative measurement of the Q factor of the particular CVG resonator oscillator mode (Qx or Qy) is generated. In the second case, an absolute measurement of the Q factor of the particular CVG resonator oscillator mode is generated. Certain MEMS CVG resonators have CVG resonator oscillator mode bandwidths of 0.01 to 1 Hz, with a typical value being 0.1 Hz. Other CVG resonators may have CVG resonator oscillator mode bandwidths of a few hundred micro-Hz. The AM modulating signal passes through each CVG resonator oscillator mode, respectively. On the output side of the CVG resonator, it passes through the DEMOD block as normal, and then it gets demodulated a second time to create a near DC low bandwidth amplitude that is proportional to the Q factor. In the first case, a relative measure of the Q is generated, because the signal will be modulated by the envelope of the CVG resonator oscillator mode transfer function. I.e., if the AM modulating signal offset frequency is 0.1 Hz, and the CVG resonator oscillator mode bandwidths are nominally 0.1 Hz, but then the Q decreases, the CVG resonator oscillator mode bandwidth will increase to say 0.11 Hz, and more of the AM modulating signal will be within the bandwidth of the CVG resonator oscillator mode, and the ultimate demodulated amplitude will increase.

Conversely, if the CVG resonator oscillator mode Q increases, the CVG oscillator mode bandwidth will decrease to say 0.09 Hz, and less of the AM modulating signal will be within the bandwidth of the CVG resonator oscillator mode, and the ultimate demodulated amplitude will decrease. Thus, if the initial CVG resonator oscillator mode Q is known, changes to that Q can be tracked by monitoring the ultimate demodulated amplitude of the AM modulating signal, and the relative Q can be extracted/generated. This can be done for both CVG resonator oscillator modes, and compensation can be fed back to the electronic damping feedback coefficients D_(e,{x,y}{x,y}) to stabilize the CVG resonator damping rates and Q factors. If the AM modulating signal has a large offset frequency, such that it falls outside the CVG resonator oscillator mode bandwidth, then the CVG resonator oscillator mode transfer function will pass the AM modulating signal in its flat off resonance portion.

Since the amplitude on resonance is known through the amplitude control loop, and the amplitude off resonance through the AM modulating signal path is known, the Q factor of the CVG resonator oscillator mode is determined by the ratio of the on resonance amplitude to the off resonance amplitude. This gives an absolute measurement of the Q factor of each CVG resonator oscillator mode. The AM modulating signal and demodulators can be constructed to produce both an absolute and a relative Q information simultaneously by modulating at multiple offset frequencies at once.

Figure 9:
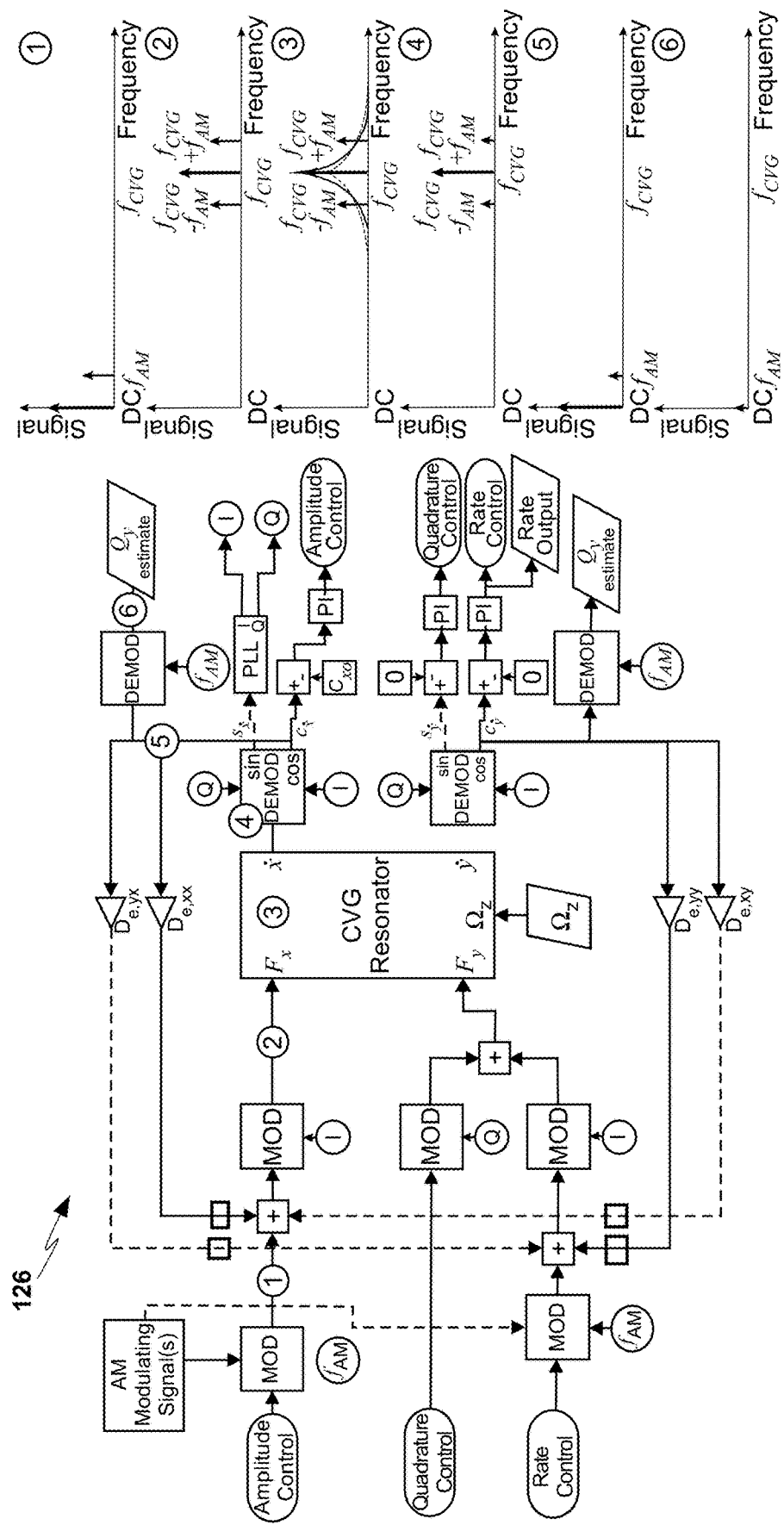
FIG. 9 illustrates the CVG of FIG. 7 as well as its operation.

Further, it should be understood that additional AM modulators and demodulators and offset frequencies may be used in combination to extract the full matrix damping information, as illustrated for example in relation with FIGS. 6-9 and 12-13 of this presentation. The Q information extracted in this way may be scaled and combined appropriately with the electronic damping feedback coefficients D_(e,{x,y}{x,y}) so that the effective CVG resonator oscillator modes Qs are always equal, theoretically eliminating the bias drift in the CVG system. FIG. 8 for example captures such an implementation in a block diagram (feedback to electronic damping feedback coefficients omitted for clarity, but should be understood from the above description). FIG. 9 further illustrates the details of the effect of the AM modulating signals at various points in the system and shows how a signal proportional to relative Q variation or absolute Q can be extracted with these techniques. Further, this scheme can be extended as necessary to detect enough values to control the electronic damping feedback coefficients D_(e,{x,y}{x,y}), i.e., measure Q_({x,y}{x,y}) by extending the above scheme.

[Lynch1998] derives the gyro bias as a function of $\Delta 1/\tau$ and $\theta\tau$ as $B=1/2k\ \Delta 1/\tau \sin[\![ 2\theta\tau ]\!]$. This bias will be constant if $\Delta 1/\tau$ and $\theta\tau$ are constant in time. The above self-calibration technique provides a means to stabilize $\Delta\ 1/\tau$ and $\theta\tau$ over time, which will prevent the bias from changing (drifting) and satisfies the long felt need to eliminate bias drift in CVG systems.

FIG. 9 illustrates the CVG 126 of FIG. 8, together with the evolution in time of signals observed in nodes numbered 1 to 6 of CVG 126.

As illustrated, CVG 126 allows generating a DC signal that is proportional to the relative or absolute Q depending on the distance of fAM away from the CVG resonance frequency $f_{CVG}$. The corresponding plots on the right indicate the total signal that would be observed at that particular point in the system in frequency domain. In particular, it can be seen at node 3 that the resonator transfer function will modulate or clip the AM modulating signal(s) depending on its Q value, which defines the width of the transfer function. A lower Q than nominal (as indicated by dashed lines) would drop the measured amplitude at $f_{CVG}$ and increase the measured at $f_{AM}$, and vice versa if the Q increases (when measured at node 4). The composite signal is brought back to baseband by the demodulator between nodes 4 and 5, and then further demodulated to extract the AM component proportional to the Q change, providing a means to estimate Q. This scheme can be extended as necessary to detect enough values to control the electronic damping feedback coefficients $D_{e(x,y)(x,y)}$, i.e., measure $Q_{(x,y)(x,y)}$ by extending the above scheme.

Figure 10:
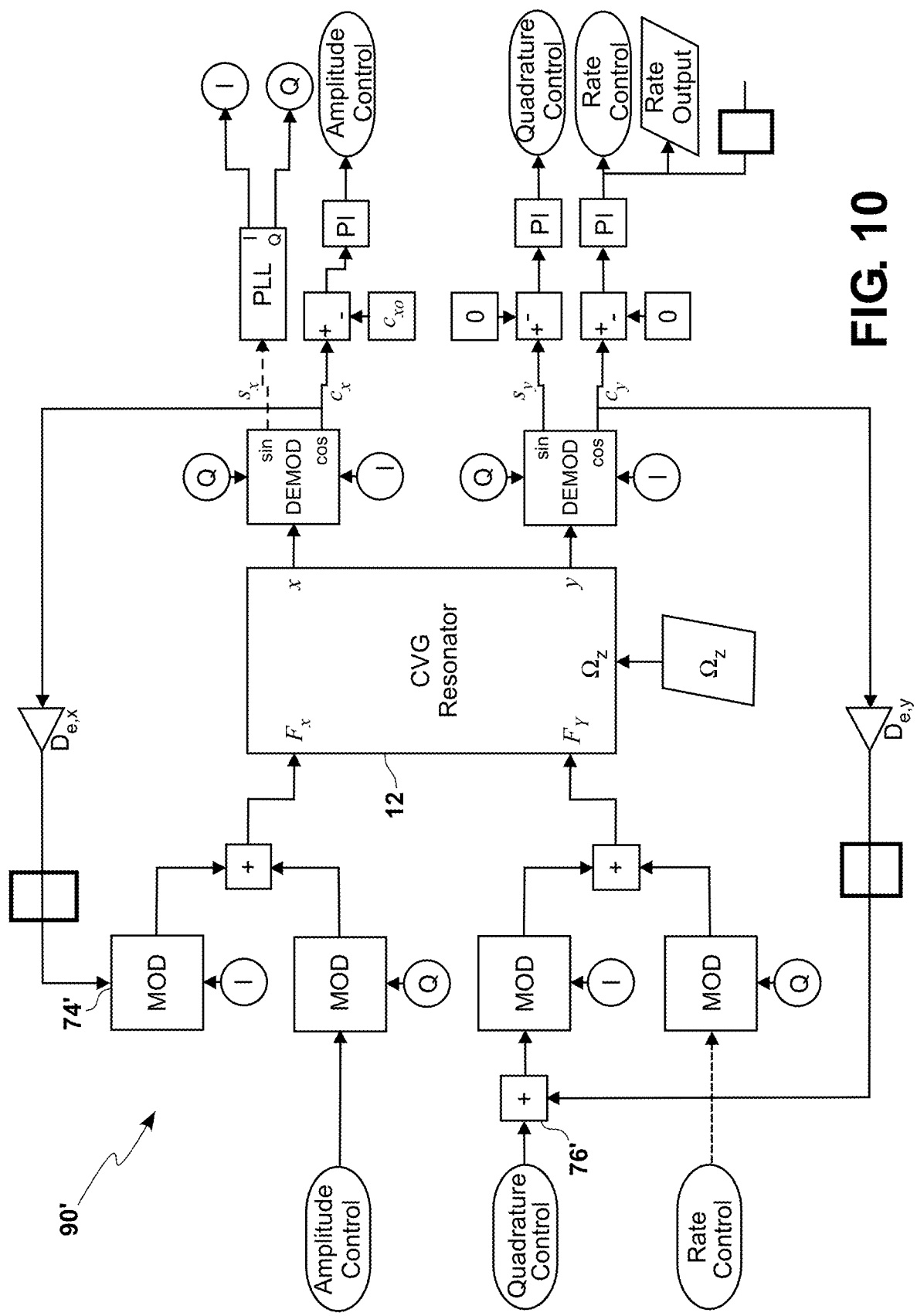
FIG. 10 illustrates another CVG according to embodiments of this presentation.

FIG. 10 illustrates a CVG 90' according to embodiments of this presentation, almost identical to the CVG 90 detailed in relation with FIG. 3, with the difference that instead of adding the first and second feedback signals 74', 76' to the amplitude control signal and rate control signal before modulating the added signals with Q, in CVG 90', the first feedback signals 74' is first modulated with I before being added to the Q-modulated amplitude control signal and the second feedback signal 76' is added to the quadrature control signal before modulating the added signals with I.

Figure 11:
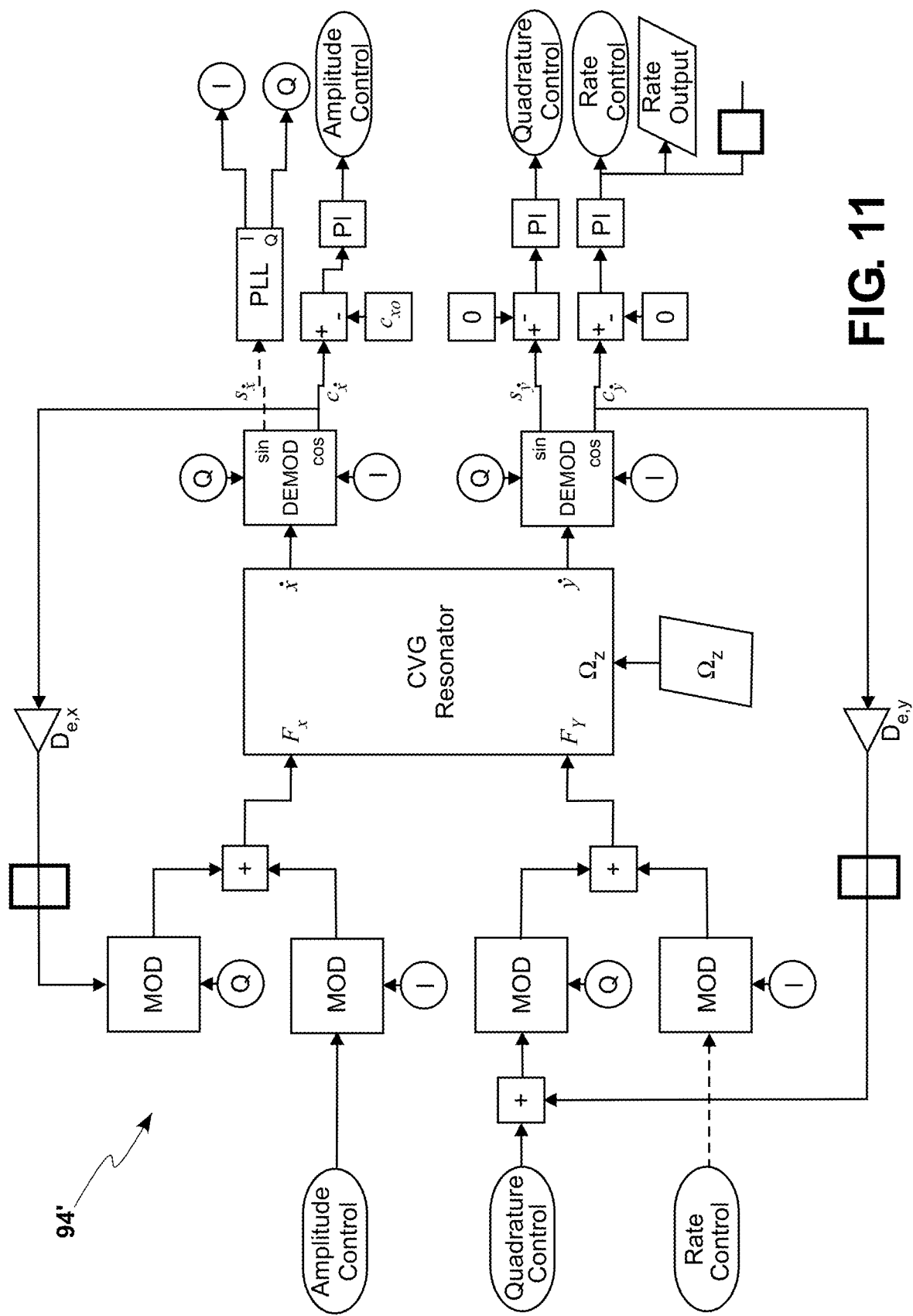
FIG. 11 illustrates another CVG according to embodiments of this presentation.

FIG. 11 illustrates a CVG 94' according to embodiments of this presentation, which differs from the CVG 94 detailed in relation with FIG. 5 in the same way as the CVG 90' of FIG. 10 differs from the CVG 90 of FIG. 3.

Figure 12:
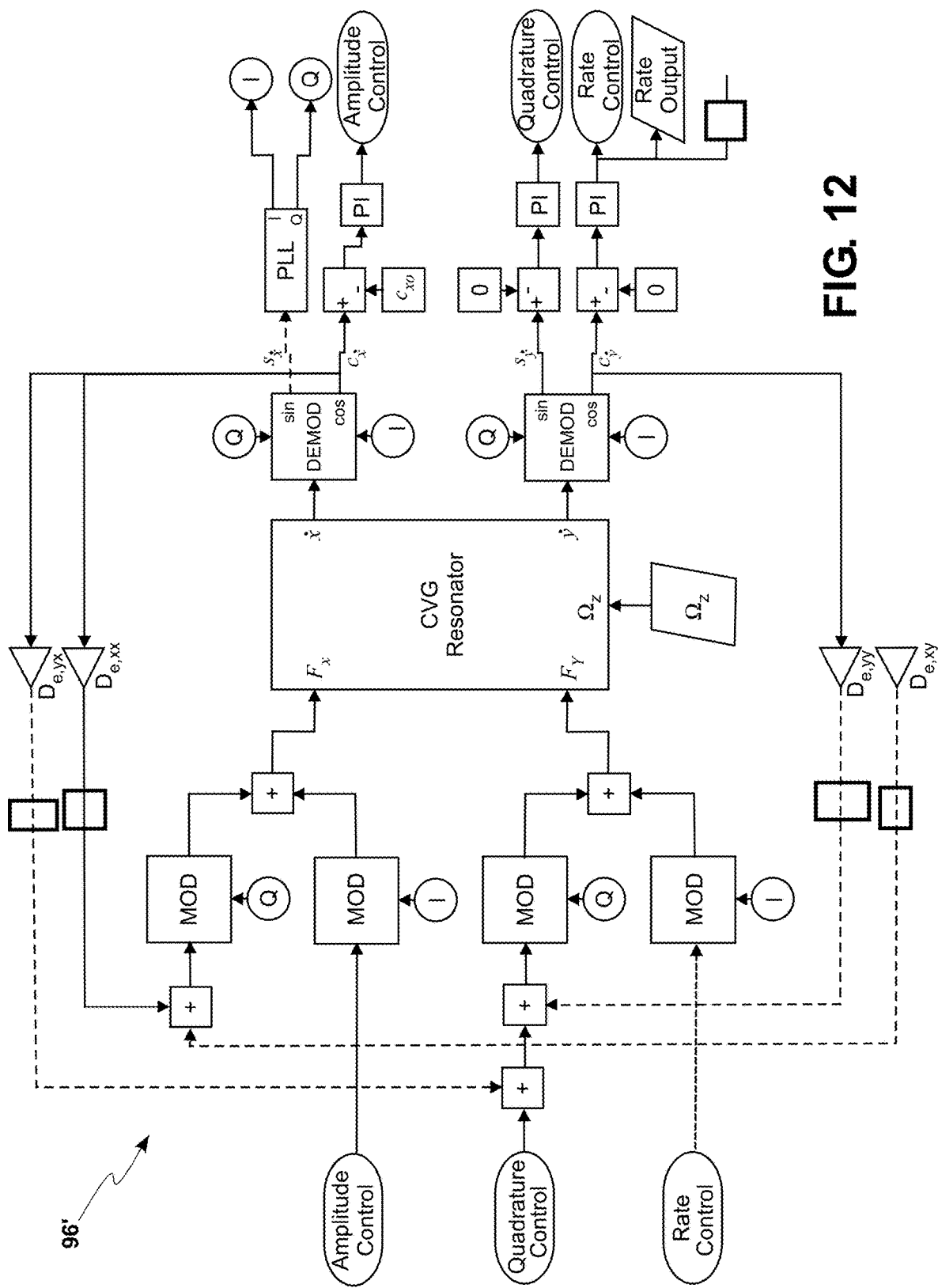
FIG. 12 illustrates another CVG according to embodiments of this presentation.

FIG. 12 illustrates a CVG 96' according to embodiments of this presentation, which differs from the CVG 96 detailed in relation with FIG. 6 in the same way as the CVG 90' of FIG. 10 differs from the CVG 90 of FIG. 3.

Figure 13:
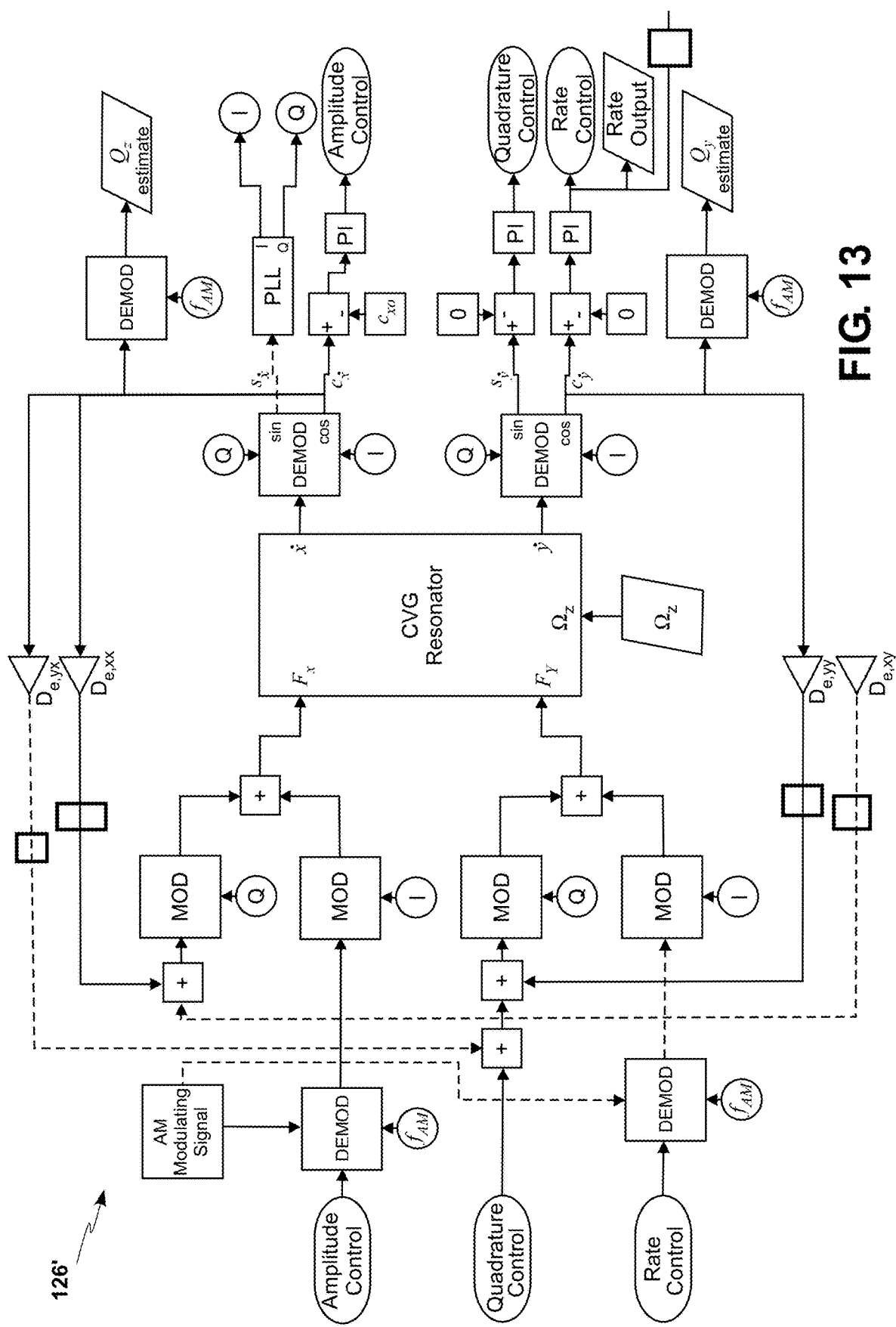
FIG. 13 illustrates another CVG according to embodiments of this presentation.

FIG. 13 illustrates a CVG 126' according to embodiments of this presentation, which differs from the CVG 126 detailed in relation with FIG. 8 in the same way as the CVG 90' of FIG. 10 differs from the CVG 90 of FIG. 3.

It has been seen above how embodiments of this presentation allow calibrating the CVG while it is being used to measure an externally applied rate. Other embodiments of this presentation allow implementing another CVG bias self-calibration method that exploits the case drift effect, which stems from the same [Lynch1998] bias equation:

$$B = \Delta/2k(1/\tau)\sin 2\Theta\tau$$

From this equation, it can be seen that if $\Delta 1/\tau$ or $\theta\tau$ is modulated appropriately by combining the bias modulating signals with the electronic damping feedback coefficients, it becomes possible to effect apparent biases in the CVG system which are modulated at the same rate as the bias modulating signals. One way to express the effect of the CVG system is through the equation:

$$\Omega'z = S \cdot (\Omega z + B) = S \cdot (\Omega z + B_{true} + K_{cal})$$

where $\Omega'z$ is the measured $\Omega z$; $B_{cal}$ is the bias response to the modulating signals imposed on the electronic damping feedback coefficients for the purposes of CVG calibration and S is the scale factor of the device. It then becomes possible to extract S by sweeping $B_{cal}$ over a desired set of equivalent input rotation rates and extracting the slope of the S vs. $B_{cal}$ curve. This is similar to a standard calibration test of a CVG on a rate table (e.g., a sine wave dither or constant equivalent rate steps). However, it is also possible to modulate the sign of $\Delta 1/\tau$ or $\sin 2\Theta T$. In the latter case, it becomes possible to use the full reversal and partial input axis reversal (PIAR) techniques disclosed in detail in U.S. application Ser. No. 16/673,878 to separate $\Omega_z$ and $B_{true}$.

One can refer to FIGS. 8, 9 and 13 that disclose a CVG according to embodiments of this presentation that can be provided to conduct such a calibration.

Overall, the claimed invention satisfies the long-felt need for a continuous online self-calibration technique for CVG systems to eliminate and/or mitigate the gyroscopic bias drift. Many prior attempts have been made to create gyroscopes with near zero bias drift as these impair the ability of an orientation or navigation system to maintain heading and position, respectively (the gyro errors accumulate with time, leading to performance limitations of these end applications of gyroscope technology). The claimed invention enables gyroscopes which would otherwise exhibit bias drift to reduce or eliminate the bias drift to near zero.

Overall, embodiments of this presentation comprise a physical CVG resonator driving one mode of the degenerate (frequency matched) gyroscopic mode pairs of the CVG resonator into resonance (termed the "drive" mode), coupling energy into the other mode of the degenerate gyroscopic mode pairs of the CVG resonator (termed the "sense" mode, the "drive" and "sense" modes being interchangeable), the rate of energy coupling being determined by an externally applied rotation rate to the case or package of the CVG resonator (the applied input rotation) through the Coriolis effect, and determining an estimate of the applied input rotation can be done by either estimating the energy in the sense mode directly or by applying a force in proportion to the energy being coupled into the sense mode such that the amount of force being applied to the sense mode is proportional (and therefore an estimate of) the applied input rotation. An artificial gyroscopic bias can be introduced by directly modulating the damping time constants of the drive and/or the sense modes such that the location of vibratory standing wave pattern of the CVG resonator follows the effective axis with the least damping in the CVG resonator. This artificial bias signal can be used to separate the instantaneous bias of the CVG system from the true applied input rotation at a given instant in time. The claimed invention can apply generally to all CVG gyroscopic systems.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . .

. " and no method or process step herein is to be construed under those provisions unless the step, or steps, are expressly recited using the phrase "comprising the step(s) of . . . ."

What is claimed is:

1. A Coriolis Vibratory Gyroscope comprising:
a resonator having first and second degenerate vibratory modes, wherein the first and second oscillator modes have different first and second damping rates;
first and second drive circuits for causing the resonator to oscillate in the first and second modes in response to first and second drive signals;
first and second sense circuits for generating first and second sense signals in response to the resonator oscillating in the first and second modes;
a signal processing circuit arranged for generating the first and second drive signals, based on the first and second sense signals, such that:
in a first operation state, where no rotation rate is input to the resonator, the first and second drive signals cause the resonator to oscillate only in the first mode at a first amplitude; and
in a second operation state, where a rotation rate is input to the resonator, and couples a portion of the oscillation in the first mode into the second mode, the first and second drive signals bring back the oscillator into the first operation state; and
first and second damping feedback circuits arranged for:
generating first and second damping feedback signals proportional respectively to the first and second damping rates; and
adding said first and second damping feedback signals to the first and second drive signals.

2. The CVG of claim 1, wherein said adding said first and second damping feedback signals to the first and second drive signals is such that the resonator has identical effective first and second damping rates on the first and second oscillator modes.

3. The CVG of claim 2, wherein:
a/ one of the first and a second damping rates is null; or
b/ at least one of the first and a second damping rates varies with time.

4. The CVG of claim 1, wherein the first and second sense signals are proportional to the displacement of the resonator in the first and second modes, and wherein the first and second damping feedback circuits generate the first and second damping feedback signals by deriving respectively the first and second sense signals and weighing them with first and second weighing factors.

5. The CVG of claim 1, wherein the first and second sense signals are proportional to the velocity of the displacement of the resonator in the first and second modes, and wherein the first and second damping feedback circuits generate the first and second damping feedback signals by weighing respectively the first and second sense signals with first and second weighing factors.

6. The CVG of claim 1, further comprising damping modulators arranged for modulating said first and second damping feedback signals before they are added to the first and second drive signals, such that the resonator has a controlled effective first damping rate and a controlled effective second damping rate.

7. The CVG of claim 6, wherein the damping modulators are arranged to control a change of the effective first and second damping rates that, in combination with the oscillation of the resonator, applies a controlled rotation rate to the resonator.

8. The CVG of claim 7, wherein the damping modulators are arranged for modulating the damping feedback signals with a dither signal; the CVG further comprising a demodulator for demodulating a measured rotation rate with said dither signal, thus allowing to measure the rotation rate due to the modulation of the damping feedback signals; and to determine a bias and scale factor of the resonator.

9. The CVG of claim 1, further comprising third and fourth damping feedback circuits arranged for:
generating third and fourth damping feedback signals proportional respectively to the first and second damping rates; and
adding said third and fourth damping feedback signals to the second and first drive signals (so as to equalize the first and second damping rates).

10. The CVG of claim 1, wherein:
the first drive circuit comprises a first drive electrode aligned with a main axis of oscillation of the first mode;
the second drive circuit comprises a second drive electrode aligned with a main axis of oscillation of the second mode;
the first sense circuit comprises a first sense electrode aligned with a main axis of oscillation of the first mode;
the second sense circuit comprises a second sense electrode aligned with a main axis of oscillation of the second mode; the first and second sense signals being proportional to the displacement of the resonator in the first and second modes; and
wherein the signal processing circuit comprises:
a phase locked loop receiving in input the first sense signal, and generating in output an in-phase reference signal and a quadrature reference signal;
an amplitude control loop receiving in input the first sense signal as well as a reference amplitude value, and generating in output an amplitude control signal, wherein the first drive signal is generated by modulating the amplitude control signal with the quadrature reference signal;
a quadrature-control loop receiving in input the second sense signal and generating in output a quadrature control signal; and
a rate control loop receiving in input the second sense signal and generating in output a rate control signal, wherein the second drive signal is generated by adding a modulation of the quadrature control signal with the in-phase reference signal, and a modulation of the rate control signal with the quadrature reference signal.

11. The CVG of claim 10, wherein:
the phase locked loop is arranged to demodulate the first sense signal with the quadrature reference signal;
the amplitude control loop is arranged to demodulate the first sense signal with the in-phase reference signal;
the quadrature control loop is arranged to demodulate the second sense signal with the quadrature reference signal; and
the rate control loop is arranged to demodulate the second sense signal with the in-phase reference signal.

12. The CVG of claim 11, wherein:
the phase locked loop is arranged to integrate the quadrature-demodulated first sense signal and provide the integrated signal to a voltage-controlled oscillator that produces the in-phase reference signal and quadrature reference signal;
the amplitude control loop is arranged to generate the amplitude control signal by integrating a comparison of the reference amplitude value with the in-phase demodulated first sense signal;

the quadrature control loop is arranged to generate the quadrature control signal by integrating the quadrature-demodulated second sense signal; and the rate control loop is arranged to generate the rate control signal by integrating the in-phase demodulated second sense signal.

13. The CVG of claim 12, further comprising third and fourth damping feedback circuits arranged for:
generating third and fourth damping feedback signals proportional respectively to the first and a second damping rates; and
adding said third and fourth damping feedback signals to the second and first drive signals; and wherein
said generating the third and fourth damping feedback signals proportional respectively to the first and a second damping rates comprises deriving respectively the first and second sense signals and weighing them with third and fourth weighing factors.

14. The CVG of claim 13, further comprising damping modulators arranged for modulating said first, second, third and fourth damping feedback signals before they are added to the first and second drive signals, such that the resonator has a controlled effective first damping rate and a controlled effective second damping rate.

15. The CVG of claim 10, wherein:
said generating the first and second damping feedback signals proportional respectively to the first and second damping rates comprises in-phase-demodulating the first and second sense signals; and
said adding the first and second damping feedback signals to the first and second drive signals comprises:
a/ adding the in-phase-demodulated first and second sense signals, weighted by predetermined first and second weighing factors, to respectively the amplitude control signal and rate control signal, (FIG. 3); or
b/ in-phase-demodulating the first sense signal, weighting the resulting signal by a predetermined first weighing factor and in-phase modulating the weighted signal before adding it to the first drive signal and in-phase-demodulating the second sense signal, weighting the resulting signal by a predetermined second weighing factor and adding the weighted signal to the quadrature control signal.

16. The CVG of claim 1, wherein the first and second damping feedback circuits are arranged to generate the first and second damping feedback signals by deriving respectively the first and second sense signals and weighing them with first and second weighing factors.

17. The CVG of claim 1, wherein:
the first drive circuit comprises a first drive electrode aligned with a main axis of oscillation of the first mode;
the second drive circuit comprises a second drive electrode aligned with a main axis of oscillation of the second mode;
the first sense circuit comprises a first sense electrode aligned with a main axis of oscillation of the first mode;
the second sense circuit comprises a second sense electrode aligned with a main axis of oscillation of the second mode; the first and second sense signals being proportional to the velocity of the displacement of the resonator in the first and second modes; and
wherein the signal processing circuit comprises:
a phase locked loop receiving in input the first sense signal, and generating in output an in-phase reference signal and a quadrature reference signal;
an amplitude control loop receiving in input the first sense signal as well as a reference amplitude value, and generating in output an amplitude control signal, wherein the first drive signal is generated by modulating the amplitude control signal with the in-phase reference signal;
a quadrature-control loop receiving in input the second sense signal and generating in output a quadrature control signal; and
a rate control loop receiving in input the second sense signal and generating in output a rate control signal, wherein the second drive signal is generated by adding a modulation of the quadrature control signal with the quadrature reference signal, and a modulation of the rate control signal with the in-phase reference signal.

18. The CVG of claim 16, wherein:
the phase locked loop is arranged to demodulate the first sense signal with the quadrature reference signal;
the amplitude control loop is arranged to demodulate the first sense signal with the in-phase reference signal;
the quadrature control loop is arranged to demodulate the second sense signal with the quadrature reference signal; and
the rate control loop is arranged to demodulate the second sense signal with the in-phase reference signal.

19. The CVG of claim 18, wherein:
the phase locked loop is arranged to integrate the quadrature-demodulated first sense signal and provide the integrated signal to a voltage-controlled oscillator that produces the in-phase reference signal and quadrature reference signal;
the amplitude control loop is arranged to generate the amplitude control signal by integrating a comparison of the reference amplitude value with the in-phase demodulated first sense signal;
the quadrature control loop is arranged to generate the quadrature control signal by integrating the quadrature-demodulated second sense signal; and
the rate control loop is arranged to generate the rate control signal by integrating the in-phase demodulated second sense signal.

20. The CVG of claim 17, wherein:
said generating the first and second damping feedback signals proportional respectively to the first and a second damping rates comprises in-phase-demodulating the first and second sense signals; and
said adding the first and second damping feedback signals to the first and second drive signals comprises:
a/ adding the in-phase-demodulated first and second sense signals, weighted by predetermined first and second weighing factors, to respectively the amplitude control signal and rate control signal; or
b/ in-phase-demodulating the first sense signal, weighting the resulting signal by a predetermined first weighing factor and quadrature-phase modulating the weighted signal before adding it to the first drive signal and in-phase-demodulating the second sense signal, weighting the resulting signal by a predetermined second weighing factor and adding the weighted signal to the quadrature control signal.

21. The CVG of claim 20, further comprising third and fourth damping feedback circuits arranged for:
generating third and fourth damping feedback signals proportional respectively to the first and a second damping rates; and
adding said third and fourth damping feedback signals to the second and first drive signals; and wherein
said generating the third and fourth damping feedback signals proportional respectively to the first and a second damping rates comprises in-phase-demodulating the first and second sense signals; and said adding the third and fourth damping feedback signals to the second and first drive signals comprises adding the in-phase-demodulated first and second sense signals, weighted by predetermined third and fourth weighing factors, to respectively the rate control signal and amplitude control signal.

22. The CVG of claim 21, further comprising damping modulators arranged for modulating said first, second, third and fourth damping feedback signals before they are added to the first and second drive signals, such that the resonator has a controlled effective first damping rate and a controlled effective second damping rate.

23. The CVG of claim 17, further comprising:
first and second amplitude modulators for amplitude-modulating respectively the amplitude control signal and rate control signal with a predetermined frequency before modulating the amplitude control signal and rate control signal with the in-phase reference signal; and first and second amplitude demodulators for demodulating respectively the in-phase demodulated first and second sense signals at said predetermined frequency; and a calculator arranged for calculating a quality factor of the resonator in the first and second modes using the outputs of the first and second amplitude demodulators.

24. A method of operating a Coriolis Vibratory Gyroscope, comprising providing and operating the CVG as recited in claim 1.

* * * * *